US012566438B2

(12) United States Patent
Prasad et al.

(10) Patent No.: US 12,566,438 B2
(45) Date of Patent: Mar. 3, 2026

(54) SYSTEM FOR MONITORING INVENTORY OF A WAREHOUSE OR YARD

(71) Applicant: KoiReader Technologies, Inc., Dallas, TX (US)

(72) Inventors: Ashutosh Prasad, Dallas, TX (US); Vivek Prasad, Bengaluru (IN)

(73) Assignee: KoiReader Technologies, Inc., Dallas, TX (US)

( * ) Notice: Subject to any disclaimer, the term of this patent is extended or adjusted under 35 U.S.C. 154(b) by 194 days.

(21) Appl. No.: 17/920,133

(22) PCT Filed: Apr. 22, 2021

(86) PCT No.: PCT/US2021/028580
§ 371 (c)(1),
(2) Date: Oct. 20, 2022

(87) PCT Pub. No.: WO2021/216830
PCT Pub. Date: Oct. 28, 2021

(65) Prior Publication Data
US 2023/0161351 A1 May 25, 2023

Related U.S. Application Data

(60) Provisional application No. 63/013,632, filed on Apr. 22, 2020.

(51) Int. Cl.
*G05D 1/00* (2024.01)
*G06Q 10/087* (2023.01)

(52) U.S. Cl.
CPC ......... *G05D 1/0214* (2013.01); *G05D 1/0225* (2013.01); *G05D 1/0246* (2013.01); *G05D 1/0276* (2013.01); *G06Q 10/087* (2013.01)

(58) Field of Classification Search
CPC .. G05D 1/0214; G05D 1/0225; G05D 1/0246; G05D 1/0276; G06Q 10/087; G06Q 10/08
See application file for complete search history.

(56) References Cited

U.S. PATENT DOCUMENTS

| 10,265,871 | B2 | 4/2019 | Hance et al. | |
| 2017/0176999 | A1* | 6/2017 | Bobda | G05D 1/0297 |
| 2018/0025310 | A1* | 1/2018 | Gabbai | G06Q 10/087 |
| | | | | 705/28 |
| 2018/0046910 | A1* | 2/2018 | Greene | G06N 3/02 |
| 2018/0088586 | A1 | 3/2018 | Hance et al. | |

(Continued)

FOREIGN PATENT DOCUMENTS

| WO | WO-2018035482 A1 * | 2/2018 | G06Q 10/087 |
| WO | WO-2020181066 A1 * | 9/2020 | G06F 18/21 |

OTHER PUBLICATIONS

PCT International Search Report and the Written Opinion for Application No. PCT/US21/28580, mailed on Aug. 2, 2021, 7 pgs.

*Primary Examiner* — Nhi Q Bui

(74) *Attorney, Agent, or Firm* — Lee & Hayes, P.C.

(57) ABSTRACT

Techniques are described for automating inventory management and monitoring at a storage facility. For example, a sensor system may be configured to capture sensor data associated with inventory stored at the storage facility. The sensor system may utilize the sensor data to extract information usable to monitor (e.g., assess damage), track, and/or order inventory.

20 Claims, 11 Drawing Sheets

700 ⟍

(56)                      References Cited

U.S. PATENT DOCUMENTS

| | | | |
|---|---|---|---|
| 2018/0200761 A1* | 7/2018 | Putcha | G06K 7/10366 |
| 2018/0370046 A1* | 12/2018 | Hance | G06Q 10/0875 |
| 2019/0179313 A1* | 6/2019 | Brady | G05D 1/0276 |
| 2021/0114239 A1* | 4/2021 | Chanduri | B25J 5/007 |

* cited by examiner

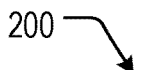

200

```
┌─────────────────────────────────────────────────────────┐
│   DETERMINE A NAVIGATION PATH WITHIN A STORAGE FACILITY  │
│        FOR AN AUTONOMOUS VEHICLE TO TRAVEL TO A          │
│                       LOCATION                           │
│                         202                              │
└─────────────────────────────────────────────────────────┘
                            │
                            ▼
┌─────────────────────────────────────────────────────────┐
│   SEND THE NAVIGATION PATH TO THE AUTONOMOUS VEHICLE     │
│                         204                              │
└─────────────────────────────────────────────────────────┘
                            │
                            ▼
┌─────────────────────────────────────────────────────────┐
│  RECEIVE AN INDICATION THAT THE AUTONOMOUS VEHICLE HAS   │
│               ARRIVED AT THE LOCATION                    │
│                         206                              │
└─────────────────────────────────────────────────────────┘
                            │
                            ▼
┌─────────────────────────────────────────────────────────┐
│   RECEIVE SENSOR DATA ASSOCIATED WITH AN INVENTORY ITEM  │
│                   AT THE LOCATION                        │
│                         208                              │
└─────────────────────────────────────────────────────────┘
                            │
                            ▼
┌─────────────────────────────────────────────────────────┐
│  DETERMINE A STATUS OF THE INVENTORY ITEM BASED AT LEAST │
│  IN PART ON AN OUTPUT OF A MACHINE LEARNED MODEL         │
│  ACCEPTING THE SENSOR DATA AS AN INPUT, THE STATUS       │
│  INCLUDING AT LEAST ONE OF INVENTORY IDENTIFICATION,     │
│  AN INVENTORY COUNT, A QUALITY STATUS, A SAFETY STATUS,  │
│  AN AGE, OR A DOCUMENTATION STATUS                       │
│                         210                              │
└─────────────────────────────────────────────────────────┘
                            │
                            ▼
┌─────────────────────────────────────────────────────────┐
│  PERFORM AN OPERATION IN RESPONSE TO THE STATUS OF THE   │
│                   INVENTORY ITEM                         │
│                         212                              │
└─────────────────────────────────────────────────────────┘
```

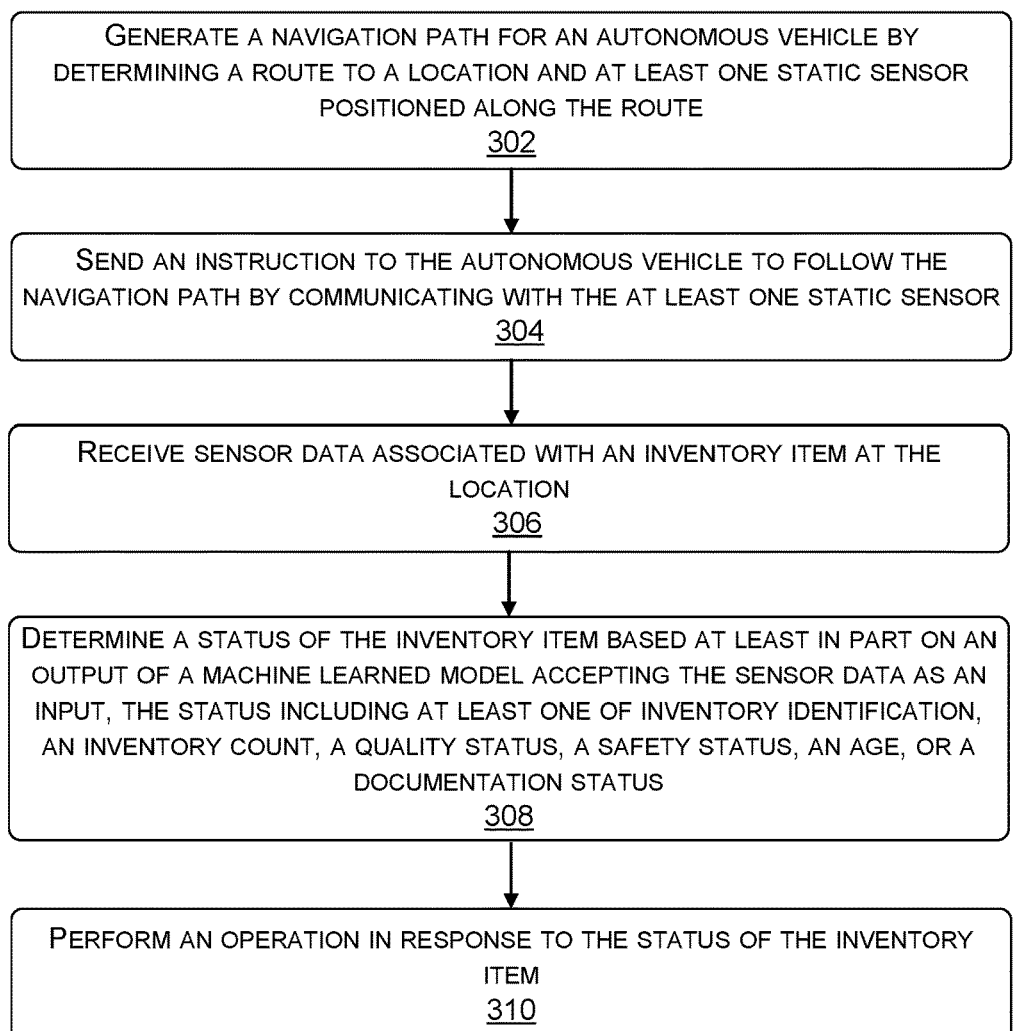

GENERATE A NAVIGATION PATH FOR AN AUTONOMOUS VEHICLE BY DETERMINING A ROUTE TO A LOCATION AND AT LEAST ONE STATIC SENSOR POSITIONED ALONG THE ROUTE
302

SEND AN INSTRUCTION TO THE AUTONOMOUS VEHICLE TO FOLLOW THE NAVIGATION PATH BY COMMUNICATING WITH THE AT LEAST ONE STATIC SENSOR
304

RECEIVE SENSOR DATA ASSOCIATED WITH AN INVENTORY ITEM AT THE LOCATION
306

DETERMINE A STATUS OF THE INVENTORY ITEM BASED AT LEAST IN PART ON AN OUTPUT OF A MACHINE LEARNED MODEL ACCEPTING THE SENSOR DATA AS AN INPUT, THE STATUS INCLUDING AT LEAST ONE OF INVENTORY IDENTIFICATION, AN INVENTORY COUNT, A QUALITY STATUS, A SAFETY STATUS, AN AGE, OR A DOCUMENTATION STATUS
308

PERFORM AN OPERATION IN RESPONSE TO THE STATUS OF THE INVENTORY ITEM
310

FIG. 3

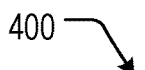

400

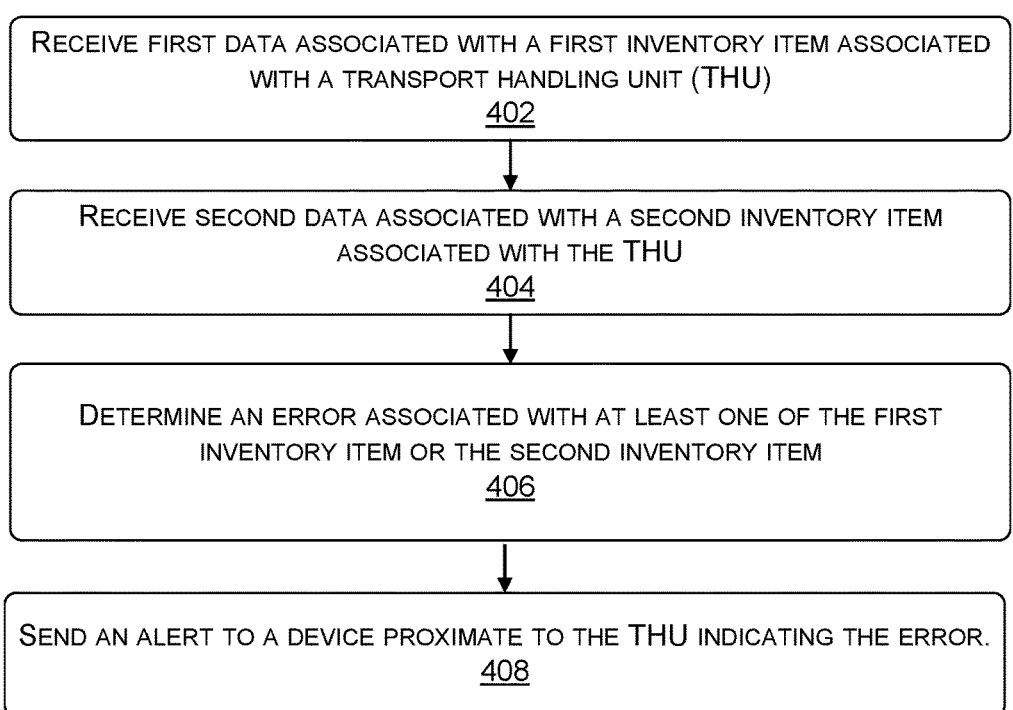

RECEIVE FIRST DATA ASSOCIATED WITH A FIRST INVENTORY ITEM ASSOCIATED WITH A TRANSPORT HANDLING UNIT (THU)
402

RECEIVE SECOND DATA ASSOCIATED WITH A SECOND INVENTORY ITEM ASSOCIATED WITH THE THU
404

DETERMINE AN ERROR ASSOCIATED WITH AT LEAST ONE OF THE FIRST INVENTORY ITEM OR THE SECOND INVENTORY ITEM
406

SEND AN ALERT TO A DEVICE PROXIMATE TO THE THU INDICATING THE ERROR.
408

FIG. 4

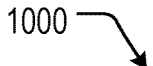
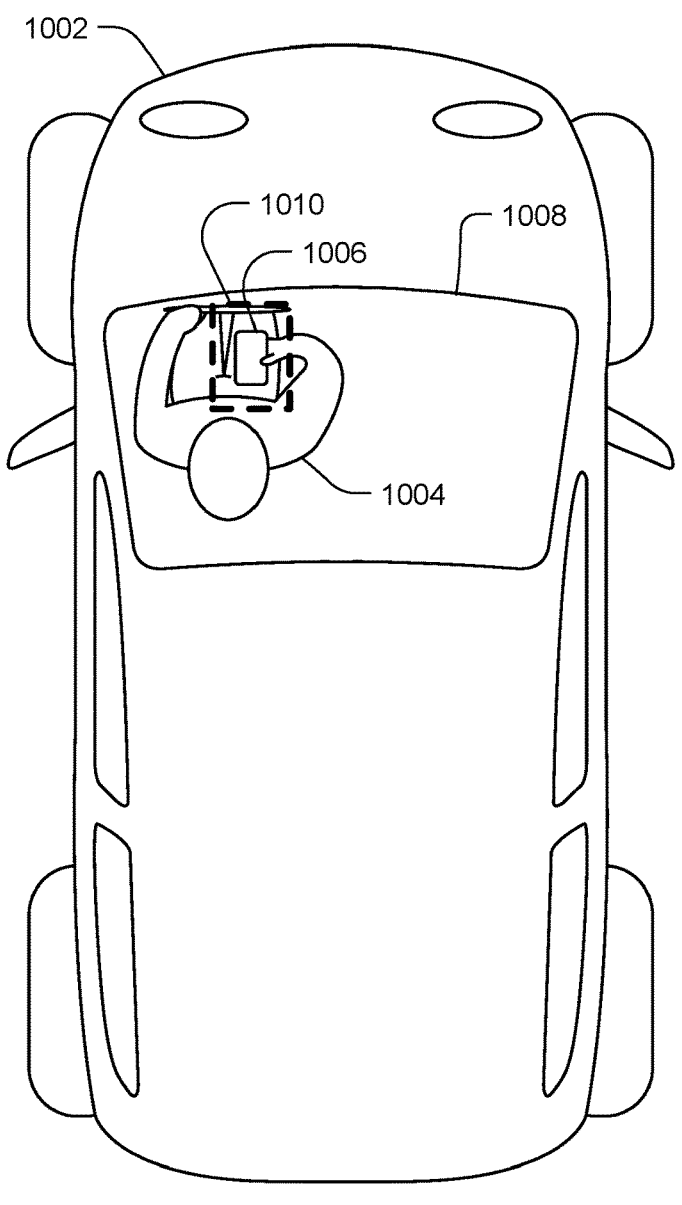
FIG. 10

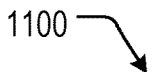
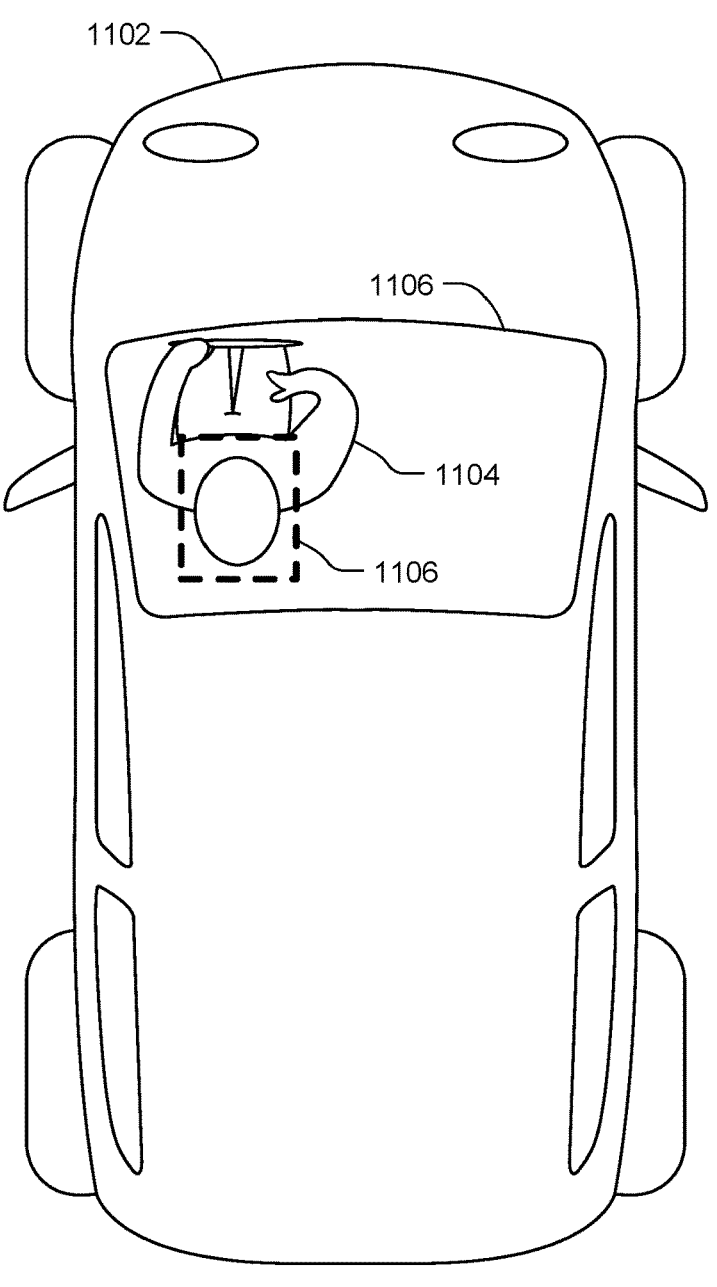
FIG. 11

SYSTEM FOR MONITORING INVENTORY OF A WAREHOUSE OR YARD

CROSS-REFERENCE TO RELATED APPLICATIONS

This application is a U.S. national stage application under 35 USC § 371 of International Application No. PCT/US21/28580 filed on Apr. 22, 2021 and entitled "SYSTEM FOR MONITORING INVENTORY OF A WAREHOUSE OR YARD," which claims priority to U.S. Provisional Application No. 63/013,632, filed on Apr. 22, 2020 and entitled "SYSTEM FOR MONITORING INVENTORY OF A WAREHOUSE OR YARD," the entire contents of which are incorporated herein by reference.

BACKGROUND

Storage facilities, such as shipping yards, processing plants, warehouses, distribution centers, ports, yards, and the like, may store vast quantities of inventory over a period of time. Monitoring the inventory may be difficult given the area of the facility and the amount of inventory to be tracked. Logistical delays may result caused by missing inventory, perishable inventory, un-ordered inventory, missing documentation associated with inventory, and the like.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 2 is a flow diagram illustrating an example process associated with monitoring inventory at a facility.

FIG. 3 is a flow diagram illustrating an example process associated with monitoring inventory at a facility.

FIG. 4 is a flow diagram illustrating an example process associated with managing vehicles and monitoring inventory at a facility.

FIG. 10 is another example pictorial view associated with the systems of FIGS. 1-5 according to some implementations.

FIG. 11 is another example pictorial view associated with the systems of FIGS. 1-5 according to some implementations.

DETAILED DESCRIPTION

Figure 1:
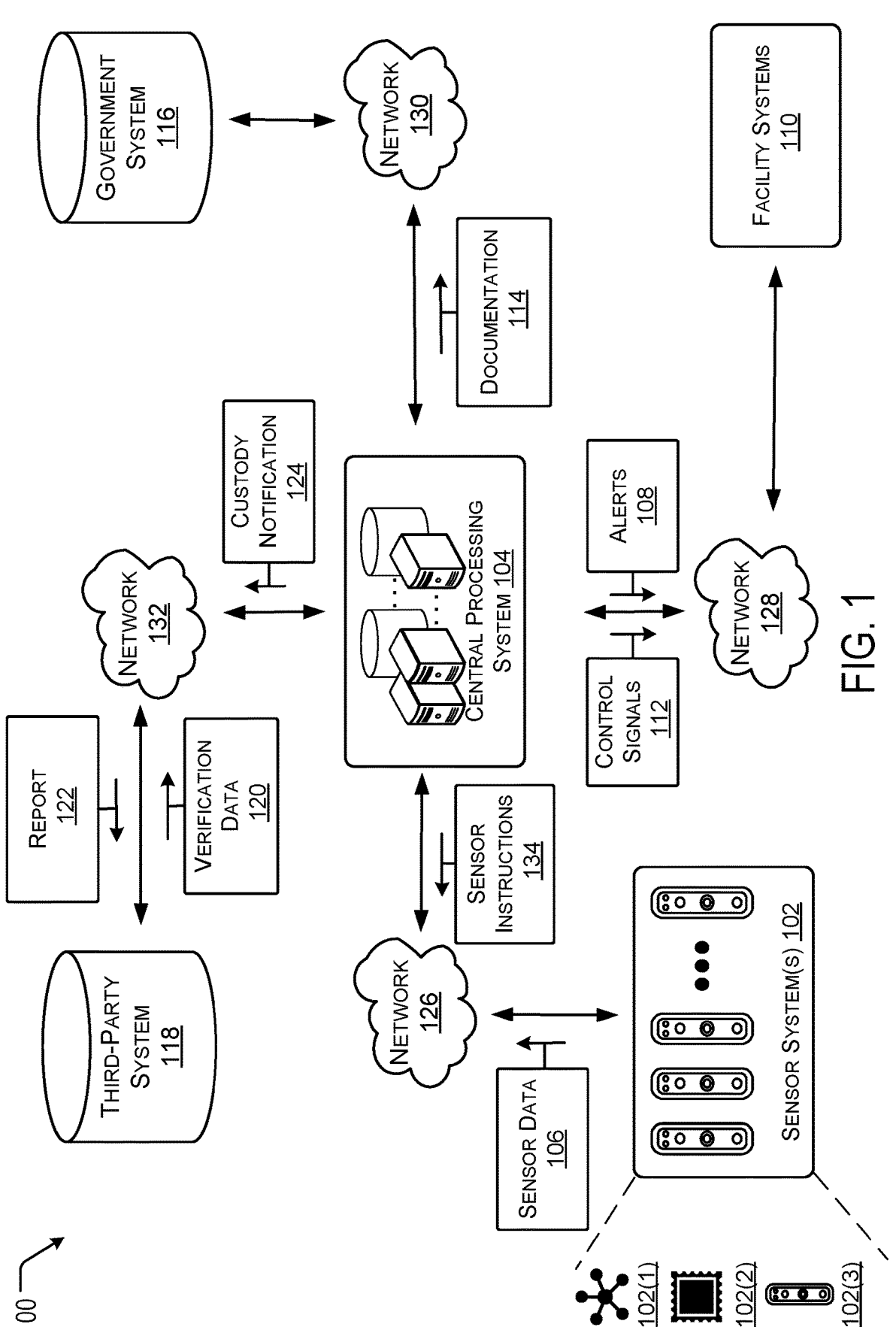
FIG. 1 is an example block diagram of a platform and sensor system for monitoring inventory at a facility, according to some implementations.

Discussed herein is a system for monitoring, tracking, and ordering inventory stored within a storage facility, warehouse, or yard. The system may include a plurality of autonomous aerial vehicles (AAV) or drones or manual/autonomous ground vehicles (e.g., reach trucks or mini pallet trucks), all of which may be referred to as "vehicles" or "autonomous vehicles" hereinafter, that are arranged throughout the facility (e.g., the warehouse or yard) such that the vehicles may rotate between charging and performing inventory management activities. In some cases, the vehicles may be equipped with at least one forward facing image capture device for capturing image data usable for detection, recognition, navigation and path planning and at least one downward facing image capture device associated with capturing images of inventory within the facility. In some cases, the vehicles may be configured for indoor navigation via a simultaneous localization and mapping (SLAM) technique or a visual simultaneous localization and mapping (VSLAM) technique. Thus, the vehicle may operate without receiving or detecting a satellite signal, such as a Global Positioning System (GPS) or Global Navigation Satellite System (GNSS) signal. In some cases, the vehicles may be small, such as less than 6 inches, less than 8 inches, or less than 12 inches in height so that the vehicles may travel between rows of a rack or storage system within the facility without crashing. In some cases, the charging stations may be configured to supercharge the batteries or power supplies of the vehicles, such that a complete charge may be obtained within 20-30 minutes and provide between 5 and 20 minutes of flight time.

In some cases, the system may also include a central processing system or server that is in wireless communication with each of the vehicles and charging stations or hubs as well as various static image capture systems or a cable-suspended camera system or other sensors (such as internet of things (IoT) based sensors) and processing equipment. The central processing system may be configured to receive image data and operational data from the vehicles, charging stations, static image capture devices, and other processing equipment. The central processing system may process the image or video data using various techniques, such as a machine learned models, to determine inventory counts, quality, status, etc. associated with the inventory within the facility. In some cases, the central processing system may identify and recognize the presence of correct sticker or label on the carton or pallet or unit loading device (ULD). In some cases, the central processing system may assist the human operators or machine(s) with optimal build process of Transport Handling Unit (THU) such as pallets, unit load devices (ULDs), ocean containers, any object that may carry or otherwise transport an inventory item, etc. In some cases, the central processing system may process the image or video data on the camera hardware or on a separate device installed in the premises to minimize data transfer over the internet. In some cases, the central processing system may determine locations or cause the processing equipment or an operator of the processing equipment to access the inventory at the location for further processing. In some cases, the central processing system may read the text written on labels or pallets or cartons or Unit Load Devices (ULDs) to estimate the inventory accuracy. In some cases, the central processing system may determine that an operator within a facility has performed an incorrect operation (e.g., incorrect pickup, put away, replenishment, etc.) and the central processing system may send a message (e.g., notification) to the operator or to another operator that the incorrect action was performed.

In one example, the central processing system along with a cable-suspended camera system or static image capture devices installed on vehicles may determine, based on the video or image data, the oldest inventory meeting a set of reequipments and provide a system or an operator of the processing equipment with instructions to retrieve the inventory and delivery to an outbound truck or vessel or other warehouse equipment's such as order fulfillment tugs (e.g., reach trucks, manual tugs, semi-autonomous tugs, or autonomous tugs). The central processing system may also determine that stock of particular types of inventory has decreased below a threshold. In this example, the central processing system may place an order for additional inventory in response to the inventory falling below the threshold. In yet another example, the central processing system may determine quality issue or problems with the inventory (such as water damage, deterioration or corrosion of inventory, rodent or insect infestations, carton or item count on individual pallets, etc.). The central processing system may also determine safety issues, such as inventory located within isles or human occupied regions of the facility or vehicle collisions. In some cases, such as when new inventory arrives, the central processing system may extract product information, quality information, government or delivery clearances or approvals, facial or personal features of the delivery operators, and otherwise check in and accept inventory for delivery on behalf of the facility. In some cases, the central processing system may reject deliveries when the inventory is incorrect, below a threshold quality level, or the paperwork associated with the driver, delivery company, delivery vehicle, etc. is deficient in one or more areas. In this example, the central processing system may change the location of the cameras by communicating with the cable-suspended camera system using wired or wireless signals.

In one example, the central processing system may receive the image data, decode the image data (e.g., generate a series of frames, segment the image data, classify objects within the image data, etc.), pre-process the video and/or image data (e.g., remove at least some of the image data prior to processing, enlarge the image in size using machine learning), track interference associated with the image data, encode the image data (e.g., in one example, generate data structures, such as vectors or arrays of characteristics associated with segmented and classified objects within the image data for input to a machine learned model, among others), analyze the data (such as process by one or more machine learned models), and then generate a normal or augmented reality based visualization of the image data or a visual/sound alert for an operator to be presented on a hardware (e.g., display device, mobile app, connected speaker, etc.). In this example, the visualization or alert may be used to notify the operator of an incorrect operation (e.g., incorrect put away or picking or replenishment of pallets or cartons or unit load devices (ULD)) that the operator may have already conducted or will conduct in the next few moments.

In some cases, the central processing system may be configured to perform the navigation and path planning (e.g., flight path or route) for individual vehicles as the vehicles traverse the facility (warehouse or yard). For example, the central processing system may receive the forward-facing image data from each of the vehicles and determine a path, trajectory, speed (acceleration, velocity, etc.) for each vehicle in substantially real time. In this manner, the vehicles may have reduced processing requirement and reduced battery usage, thereby allowing the vehicles to be smaller and remain aloft for longer periods of time. For example, the navigation and path planning modules of the central processing system may receive the image data, segment the image data, identify obstructions to a planned path of the vehicle (e.g., navigation path, flight path, etc.), classify the obstructions (e.g., static or dynamic), determine a risk associated with the obstruction, perform tracking on the obstruction, and generate a trajectory or alert to avoid the obstruction or an estimated position of the obstruction (e.g., when the obstruction is dynamic). In some cases, the path of each vehicle may be preplanned or reoccurring via known safe passages. In these cases, the central processing system may be configured to perform obstruction avoidance or otherwise detect and avoid unexpected obstructions or obstacles within the path of the vehicles in substantially real-time. Thus, in these cases, the processing and resources and time associated with planning the path or trajectory of the vehicles may be reduced.

The central processing system may also determine a rotation or schedule associated with scanning the facility (e.g., determining all items in a facility are inventoried on a regular basis), assigning vehicles to areas or regions of the facility for inventorying (e.g., to avoid collision between vehicles), recharging the vehicles, and movement/assignment of other processing equipment to various tasks and regions of the facility (e.g., loading/unloading of delivery vehicles or shelving within the facility, assembly of components or packages, etc.), etc.

The central processing system may also include dock door scheduling instructions. For example, static or real-time image capture devices in addition to other sensors (e.g., weight, motion, proximity, etc.) associated with each dock door may be in wireless or Ethernet (Local Area Network (LAN) or Wide Local Area Network (WLAN), etc.) based communication with the central processing system. The central processing system may then determine if a delivery arrives either late or early, check-in and/or validate credentials of the delivery personnel/vehicle, accept or reject the delivery (e.g., based on quantity, quality, damage, etc.), equipment required for loading/unloading are present at the dock door or if these equipment are available for use based on the dock door utilization, and determine if the unloading/loading process is completed early, timely, or late. In some cases, the central processing system may check the open/closed/damaged state of the carton or count and identify the details printed (e.g., SKU, MRP, manufacturing date, expiry date, etc.) on the carton or pallet (e.g., transport handling unit (THU)) or unit load device or a label attached to a carton or pallet or unit load device that are being loaded or unloaded. In some cases, the central processing system may measure the weight, size, and/or volume of the object or material (e.g., carton, pallet, unit load device, goods, etc.) using dimensions captured with the help of sensors such as LIDAR, RGB Camera, Stereo Camera, SWIR system, etc. In some cases, the central processing system may adjust delivery times and locations (e.g., docks), update location (warehouse, distribution center, cross-dock, consolidation/de-consolidation center), and/or equipment availability, based on the information received from the dock door sensors and image capture devices.

In some cases, the image data captured by the vehicles, charging stations, static image capture devices, and other processing equipment may include, but is not limited to, red-green-blue image systems, infra-red image systems, radar-based image systems, LIDAR based image systems, SWIR based image systems, and/or radio wave based image systems. In some cases, the system may combine data from different data sources such as the image sensors discussed above (LIDAR, SWIR, Radio Wave, etc.) to monitor the inventory.

In some cases, the vehicles, charging stations, and or static sensors positioned throughout the facility (such as sensors installed in aisles, at dock doors, etc.) may include various types of IoT sensors. For example, the sensors may include Bluetooth or other wireless or wired based sensors, inertial measurement units (IMU)s, infrared based sensors, temperature gauges, motion sensors, weight sensors, proximity sensors, RFID sensors, etc. In some cases, the sensor data may be used to assist the central processing system in charting or planning a path of each of the vehicles or in recognizing the exact floor or rack location in the premise.

In some implementations, the static image capture devices or sensors may be configured to trigger in a predefined order. In this example, the sensors may include a wireless emitter and the vehicles may be configured to follow the path associated with the wireless signal. For example, each emitter within an aisle or rack may be active and deactivated in a sequence to cause the vehicle to fly down the aisle or between two racks. In this manner, the vehicle may travel from one emitter to the next reducing the overall complexity associated with path finding and navigation in indoor and/or outdoor environments. In some cases, one or more vehicle may be paired to the emitters or sensors of a particular isle or rack, such that the sensors along the isle or rack only cause a desired one of the plurality of vehicles to traverse the rack or isle, thereby preventing inadvertent collisions.

In other implementations, the sensors may trigger or activate in response to detecting a nearby vehicles. In this manner, the central processing system may only receive data from sensors or image capture devices in proximity (e.g., within a threshold distance) of a vehicle, thereby reducing the amount of data to be processed. In another implementation, the sensors and/or image capture devices may be activated and deactivated along the planned path of the vehicles based on an estimated location or time at which the vehicle is passing by the corresponding sensors and/or image capture device.

In another implementation, the vehicle may be paired or wirelessly coupled to a manual or guide vehicle (manual or semi-autonomous or autonomous tug, etc.). In some cases, the guide vehicle may traverse the facility and the central processing system and/or each vehicle may then implement a planned path based at least in part on the path traversed by the guide vehicle. In some cases, the guide vehicle may be an vehicle that is configured to perform path planning in an indoor environment such as via a SLAM or VSLAM technique discussed above while the remainder of the vehicles (or scanning vehicles) may be smaller vehicles configured to follow the planned path without additional navigation capabilities.

In various implementations, if a battery or power supply of an vehicle falls below a threshold, the vehicle may alert or notify the central processing system and return to the charging station. The central processing system may then activate or assign a second fully charged vehicle to resume scanning from the location along the planned path that the first vehicle stopped.

In some cases, different vehicles may be equipped with different kinds of image devices, such that as part of the rotation or schedule, vehicles equipped with different type of image capture devices may capture image data associated with the same inventory or region of the facility at different times. The central processing system may then use the combination of the different types of image data to generate the visualization of the image data, place orders to replenish inventory, or provide instructions and/or assignments to the processing equipment and facility personnel. In some cases, in addition to a forward facing and downward facing image capture device, the vehicle may be equipped with various other types of sensors, such as stereo vision sensors, ultrasonic (sonar) sensors, time-of-flight sensors, lidar sensors, infrared sensors, monocular vision sensors, IMUs, proximity sensors, gravity sensors, etc.

As described herein, the machine learned models may be generated using various machine learning techniques. For example, the models may be generated using one or more neural network(s). A neural network may be a biologically inspired algorithm or technique which passes input data (e.g., image and sensor data captured by the IoT computing devices) through a series of connected layers to produce an output or learned inference. Each layer in a neural network can also comprise another neural network or can comprise any number of layers (whether convolutional or not). As can be understood in the context of this disclosure, a neural network can utilize machine learning, which can refer to a broad class of such techniques in which an output is generated based on learned parameters.

As an illustrative example, one or more neural network(s) may generate any number of learned inferences or heads from the captured sensor and/or image data. In some cases, the neural network may be a trained network architecture that is end-to-end. In one example, the machine learned models may include segmenting and/or classifying extracted deep convolutional features of the sensor and/or image data into semantic data. In some cases, appropriate truth outputs of the model in the form of semantic per-pixel classifications (e.g., vehicle identifier, container identifier, driver identifier, and the like).

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, Res-NeXt101, VGG, DenseNet, PointNet, CenterNet and the like. In some cases, the system may also apply Gaussian blurs, Bayes Functions, color analyzing or processing techniques and/or a combination thereof.

FIG. 1 is an example block diagram 100 of a sensor system 102 and a central processing system 104 for monitoring inventory at a storage facility. For example, a storage facility may house inventory, the sensor systems 102 may be configured to monitor the inventory and capture sensor data 106 (e.g., video, images, and the like) associated with the inventory, vehicles, one or more driver(s) of the vehicle, and/or obstructions (e.g., containers, crates, pallets, etc.). In some cases, the sensor system 102 may include one or more vehicle(s) 102(1), charging station(s) 102(2), and/or static sensor(s) 102(3), and the sensor data 106 may be used to navigate the vehicle(s) 102(1) through the storage facility.

In some cases, the central processing system 104 may use the sensor data 106 received from the sensor system 102 process image data using various techniques, such as a machine learned models, to determine inventory counts, quality, status, etc. associated with the inventory within the facility. In some cases, the central processing system 104 may determine locations or cause processing equipment or an operator of the processing equipment to access the inventory at the location for further processing.

In one example, the central processing system 104 may determine, based on the sensor data 106, the oldest inventory meeting a set of reequipments and provide alerts 108 to facility systems 110 or an operator of the processing equipment with the alert 108 to retrieve the inventory and deliver the inventory to an outbound truck or vessel. In some cases, the central processing system 104 may generate control signals 112 for the facility systems 110. For instance, the control signal 112 may cause a facility gate to open or a crane or other unloading/loading equipment to commence a corresponding operation (e.g., unloading or loading of inventory). The central processing system 104 may also determine that stock of particular types of inventory has decreased below a threshold. In this example, the central processing system 104 may place an order for additional inventory in response to the inventory falling below the threshold. In some cases, the order for additional inventory may be in the form of an alert 108 to the facility systems 110. In yet another example, the central processing system 104 may determine quality issue or problems with the inventory (such as water damage, deterioration or corrosion of inventory such as pallet/carton/SKU/goods/etc., rodent or insect infestations, carton or item count on individual pallets, etc.). The central processing system 104 may send an alert 108 to the facility systems alerting an operator of the facility to the quality issue. The central processing system 104 may also determine safety issues, such as inventory, or other items stored in the facility, located within isles or human occupied regions of the facility. The central processing system 104 may send an alert 108 to the facility systems alerting an operator of the facility to the safety issue. In some cases, such as when new inventory arrives, the central processing system 104 may extract product information, quality information, government or delivery clearances or approvals, facial or personal features of the delivery operators, and otherwise check in and accept inventory for delivery on behalf of the facility. In some cases, the central processing system 104 may reject deliveries when the inventory is incorrect, below a threshold quality level, or the paperwork associated with the driver, delivery company, delivery vehicle, etc. is deficient in one or more areas.

In one example, the central processing system 104 may receive the sensor data 106, decode the sensor data 106 (e.g., generate a series of frames, segment the image data, classify objects within the image data, etc.), pre-process the sensor data 106 (e.g., remove at least some of the image data prior to processing), track interference associated with the sensor data 106, encode the sensor data 106 (e.g., in one example, generate data structures, such as vectors or arrays of characteristics associated with segmented and classified objects within the image data for input to a machine learned model, among others), analyze the sensor data 106 (such as process by one or more machine learned models), and then generate a visualization of the sensor data 106 for an operator to be presented on a display device.

In some cases, the central processing system 104 may be configured to perform the navigation and path planning (e.g., navigation path, flight path, etc.) for individual vehicles 102(1) as the vehicles 102(1) traverse the facility (warehouse or yard) and provide this information via the sensor instructions 134. For example, the sensor data 106 received by the central processing system 104 may include forward-facing image data from each of the vehicles 102(1) and the central processing system 104 may determine a path, trajectory, speed (acceleration, velocity, etc.) for each vehicle 102(1) in substantially real time. In this manner, the vehicles 102(1) may have reduced processing requirement and reduced battery usage, thereby allowing the vehicles 102(1) to be smaller and remain aloft for longer periods of time. For example, the navigation and path planning modules of the central processing system 104 may receive the sensor data 106, segment image data included in the sensor data 106, identify obstructions to a planned path of the vehicle 102(1), classify the obstructions (e.g., static or dynamic), determine a risk associated with the obstruction, perform tracking on the obstruction, and generate a trajectory to avoid the obstruction or an estimated position of the obstruction (e.g., when the obstruction is dynamic). In some cases, the path of each vehicle 102(1) may be preplanned or reoccurring via known safe passages. In these cases, the central processing system 104 may be configured to perform obstruction avoidance or otherwise detect and avoid unexpected obstructions or obstacles within the flight path of the vehicles 102(1) in substantially real-time and provide navigation path instructions accordingly, via the sensor instructions 134. Thus, in these cases, the processing and resources and time associated with planning the path or trajectory of the vehicles 102(1) may be reduced.

The central processing system 104 may also send sensor instructions 134 to the sensor system 102 after determining a rotation or schedule associated with scanning the facility (e.g., determining all items in a facility are inventoried on a regular basis), assigning vehicles 102(1) to areas or regions of the facility for inventorying (e.g., to avoid collision between vehicles 102(1)), recharging the vehicles 102(1), and movement/assignment of other processing equipment to various tasks and regions of the facility (e.g., loading/unloading of delivery vehicles or shelving within the facility, assembly of components or packages, etc.), etc.

In some cases, the sensor data 106 captured by the vehicles 102(1), charging stations 102(2), static sensors 102(3), and other processing equipment may include, but is not limited to, red-green-blue image systems, infra-red image systems, radar-based image systems, LIDAR based image systems, SWIR based image systems, and/or radio wave based image systems. In some cases, the system may combine data from different data sources such as the image sensors discussed above (LIDAR, SWIR, Radio Wave, etc.) to monitor the inventory.

In some cases, the vehicles 102(1), charging stations 102(2), static sensors 102(3) positioned throughout the facility (such as sensors installed in aisles, at dock doors, etc.) may include various types of IoT sensors. For example, the sensors may include Bluetooth or other wireless or wired based sensors, inertial measurement units (IMU)s, infrared based sensors, temperature gauges, motion sensors, weight sensors, proximity sensors, etc. In some cases, the sensor data 106 may be used to assist the central processing system 104 in charting or planning a path of each of the Vehicles 102(1).

In some implementations, the static sensors 102(3) may be configured to trigger in a predefined order. In this example, the static sensors 102(3) may include a wireless emitter and the vehicles 102(1) may be configured to follow the path associated with the wireless signal. For example, each emitter within an aisle or rack may be active and deactivated in a sequence to cause the vehicle 102(1) to fly down the aisle or between two racks. In this manner, the vehicle 102(1) may travel from one emitter to the next reducing the overall complexity associated with path finding and navigation in indoor and/or outdoor environments. In some cases, one or more vehicle 102(1) may be paired to the emitters or static sensors 102(3) of a particular isle or rack, such that the static sensors 102(3) along the isle or rack only cause a desired one of the plurality of vehicles 102(1) to traverse the rack or isle, thereby preventing inadvertent collisions.

In other implementations, the static sensors 102(3) may trigger or activate in response to detecting a nearby vehicle 102(1). In this manner, the central processing system 104 may only receive sensor data 106 from static sensors 102(3) devices in proximity (e.g., within a threshold distance) of an vehicle 102(1), thereby reducing the amount of data to be processed. In another implementation, the static sensors 102(3) may be activated and deactivated along the planned path of the vehicles 102(1) based on an estimated location or time at which the vehicle 102(1) is passing by the corresponding static sensors 102(3).

In another implementation, the vehicle 102(1) may be paired or wirelessly coupled to a manual or guide vehicle (manual or semi-autonomous or autonomous tug, etc.). In some cases, the guide vehicle may traverse the facility and the central processing system 104 and/or each vehicle 102 (1) may then implement a planned path based at least in part on the path traversed by the guide vehicle. In some cases, the guide vehicle may be an vehicle 102(1) that is configured to perform path planning in an indoor environment such as via a SLAM or VSLAM technique discussed above while the remainder of the vehicles 102(1) (or scanning vehicles 102(1)) may be smaller vehicles configured to follow the planned path without additional navigation capabilities.

In various implementations, if a battery or power supply of an vehicle 102(1) falls below a threshold, the vehicle 102(1) may alert or notify the central processing system 104 and return to its respective charging station 102(2). The central processing system 104 may then activate or assign a second fully charged vehicle 102(1) to resume scanning from the location along the planned path that the first vehicle 102(1) stopped.

In some cases, different vehicles 102(1) may be equipped with different kinds of image devices, such that as part of the rotation or schedule, Vehicles 102(1) equipped with different type of image capture devices may capture image data associated with the same inventory or region of the facility at different times. The central processing system 104 may then use the combination of the different types of image data to generate the visualization of the image data, place orders to replenish inventory, or provide instructions and/or assignments to the processing equipment and facility personnel. In some cases, in addition to a forward facing and downward facing image capture device, the vehicle 102(1) may be equipped with various other types of sensors, such as stereo vision sensors, ultrasonic (sonar) sensors, time-of-flight sensors, lidar sensors, infrared sensors, monocular vision sensors, IMUS, proximity sensors, gravity sensors, etc.

The central processing system 104 may also include dock door scheduling instructions. For example, static devices 102(3) (e.g., real-time image capture devices) in addition to other sensors (e.g., weight, motion, proximity, etc.) associated with each dock door may be in wireless or Ethernet (Local Area Network (LAN) or Wide Local Area Network (WLAN), etc.) based communication with the central processing system 104. The central processing system 104 may then determine if a delivery arrives either late or early, check-in and/or validate credentials of the delivery personnel/vehicle, accept or reject the delivery (e.g., based on quantity, quality, damage, etc.), equipment required for loading/unloading are present at the dock door or if these equipment are available for use based on the dock door utilization, and determine if the unloading/loading process is completed early, timely, or late. In some cases, the central processing system 104 may adjust delivery times and locations (e.g., docks), update location (warehouse, distribution center, cross-dock, consolidation/de-consolidation center), and/or equipment availability, based on the information received from the static devices 102(3).

In some cases, the captured sensor data 106 may be used to verify a vehicle, driver, container or contents of the container, and the like. In some instances, the central processing system 104 may process the sensor data 106, for instance, using one or more machine learned model(s) to segment, classify, and identify the desired information (e.g., the driver's identifier, the vehicle identifier, and/or the container identifier).

In some examples, the sensor data 106 may also be utilized to determine a state or status of the vehicle, container, chassis, or the like. For example, the state or status may be used to determine if damage occurred during shipping and/or if any repairs to the vehicle, container, or chassis are necessary before redeployment. In some instances, additional machine learned models may be employed by the sensor system 102 and/or the central processing system 104 to detect damage or other wear and tear of the vehicle, container, and/or chassis. In some specific examples, the sensor systems 102 may include infrared, thermal, or other types of sensors capable of imaging or generating sensor data 106 associated with the contents of the container without opening the container. In these examples, the sensor data 106 may also be used to detect any damage caused to the contents of the containers during shipping prior to the facility accepting custody, liability, and/or responsibility for the contents. For instance, the sensor system 102 and/or the central processing system 104 may compare the captured sensor data 106 and/or the status output by the machine learned models to a recorded status of the vehicle, container, and/or chassis associated with the vehicle, container, and/or chassis at the time of deployment.

In the current example, the central processing system 104 or other central computing system may be configured to, upon verification of the driver, vehicle, container, or the like, generate control signals 112 for the facility systems 110. For instance, the control signal 112 may cause a facility gate to open or a crane or other unloading/loading equipment to commence a corresponding operation (e.g., unloading or loading of goods). The central processing system 104 may also generate one or more alert(s) 108 to various systems 110 or operators within the facility instructing the operators to perform various tasks or notifying the operators as to a status of the vehicle, container, or chassis. As an illustrative example, if the sensor system 102 or the central processing system 104 detected damage to the container, the alert 108 may instructs an operator to perform a manual inspection of the contents of the container.

The sensor system 102 and/or the central processing system 104 may also be configured to complete and submit various types of documentation associated with the vehicle, containers, and/or content of the containers at the time the vehicle enters or exits the facility. For example, as illustrated, if the vehicle is a ship entering a port carrying goods in international trade, the sensor system 102 and/or the central processing system 104 may capture the sensor data 106 and complete, using the output of the machine learned models, various customs forms and government documentation 114. In some examples, the sensor system 102 and/or the central processing system 104 may detect labeling, identifiers, and other markers, in any language, and select appropriate government entities based on the detected information. The sensor system 102 and/or the central processing system 104 may then determine the appropriate government systems 116 and documentation 114 based on the selected government entities. The sensor system 102 and/or the central processing system 104 may then submit the documentation 114 to the corresponding systems 116 as required by the laws of the different jurisdictions.

The facility may also generate and send reports 122 associated with various statuses, documents, and data to various third-party systems 118 in addition to the government entities. For example, the sensor system 102 and/or the central processing system 104 may complete various reports 122 including the state or status of the vehicle, container, chassis, contents and the like to the owner of the goods at the time of entry and/or exit of the vehicle to and from the facility. As one illustrative example, the sensor system 102 and/or the central processing system 104 may request and receive verification data 120 from the third-party system 118 associated with a vehicle attempting to enter the facility. The verification data 120 may be utilized to verify or authenticate the driver, vehicle, and/or container using the extracted identifiers from the vehicle, container, chassis, and the like.

In some cases, the sensor system 102 and/or the central processing system 104 may also preform facial or other biometric identification of the driver to assist with determining an identity without having to access driver documents, such as a license. In one specific example, the driver may be instructed to place or hold various documents in a manner that the documents are visible through, for instance, a front or side windshield. In other examples, the facility may include a document reader sensor located proximate to the entry and/or exit of the facility. The driver may then place the physical documents to be scanned within the reader sensor. In this manner, the sensor system 102 may capture sensor data 106 associated with various physical paperwork associated with the driver, vehicle, container, and/or contents of the container and, thereby, extract information not readably available on the exterior of the vehicle, container, and/or chassis. Examples of data that may be extracted for either completing the government documents 114 and/or for reporting to the third-party systems 118 may include shipping documents, vehicle license plates, vehicle ID where applicable, container IDs, vehicle yin numbers, chassis ID, chassis' license plate, SKU ID, pallet ID, safety inspection sticker, rail car details, and the like.

Once the sensor system 102 and/or the central processing system 104 has parsed or extracted the information, the government documents 114 are processed by the government entity, the sensor system 102 and/or the central processing system 104 may cause the facility to accept or deny custody of the vehicle, container, and/or contents of the container. The sensor system 102 and/or the central processing system 104 may also report the acceptance and/or denial of the custody to the third-party system 118, such as the shipper entity, via a custody notification 124, as shown.

In the current example, the sensor data 106, documentation 114, control signals 112, alerts 108, custody notifications 124, verification data 120 reports 122, and sensor instructions 134 as well as other data may be transmitted between various systems using networks, generally indicated by 126-132. The networks 126-132 may be any type of network that facilitates compunction between one or more systems and may include one or more cellular networks, radio, WiFi networks, short-range or near-field networks, infrared signals, local area networks, wide area networks, the interne, and so forth. In the current example, each network 126-132 is shown as a separate network but it should be understood that two or more of the networks may be combined or the same.

FIGS. 2-4 are flow diagrams illustrating example processes associated with the sensor systems and central processing systems for managing and monitoring inventory at a storage facility discussed herein. The processes are illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, which when executed by one or more processor(s), perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 2 is a flow diagram illustrating an example process 200 associated with the sensor systems and central processing systems for managing and monitoring inventory at a storage facility according to some implementations.

At 202, a central processing system may determine a navigation path within a storage facility for an autonomous vehicle to travel to a location. For example, the central processing system 104 may be configured to perform the navigation and path planning (e.g., flight path) for individual vehicles 102(1) as the vehicles 102(1) traverse the facility (warehouse or yard) and provide this information via the sensor instructions 134. For example, the sensor data 106 received by the central processing system 104 may include forward-facing image data from each of the vehicles 102(1) and the central processing system 104 may determine a path, trajectory, speed (acceleration, velocity, etc.) for each vehicle 102(1) in substantially real time. In this manner, the vehicles 102(1) may have reduced processing requirement and reduced battery usage, thereby allowing the vehicles 102(1) to be smaller and remain aloft for longer periods of time. For example, the navigation and path planning modules of the central processing system 104 may receive the sensor data 106, segment image data included in the sensor data 106, identify obstructions to a planned path of the vehicle 102(1), classify the obstructions (e.g., static or dynamic), determine a risk associated with the obstruction, perform tracking on the obstruction, and generate a trajectory to avoid the obstruction or an estimated position of the obstruction (e.g., when the obstruction is dynamic). In some cases, the path of each vehicle 102(1) may be preplanned or reoccurring via known safe passages. In these cases, the central processing system 104 may be configured to perform obstruction avoidance or otherwise detect and avoid unexpected obstructions or obstacles within the flight path of the vehicles 102(1) in substantially real-time and provide flight path instructions accordingly, via the sensor instructions 134. Thus, in these cases, the processing and resources and time associated with planning the path or trajectory of the vehicles 102(1) may be reduced.

At 204, a central processing system may send the navigation path to the autonomous vehicle and at 206 a central processing system may receive an indication that the autonomous vehicle has arrived at the location. For example, the central processing system 104 may send sensor instructions 134 to the sensor system 102 after determining a rotation or schedule associated with scanning the facility (e.g., determining all items in a facility are inventoried on a regular basis), assigning vehicles 102(1) to areas or regions of the facility for inventorying (e.g., to avoid collision between vehicles 102(1)), recharging the vehicles 102(1), and movement/assignment of other processing equipment to various tasks and regions of the facility (e.g., loading/unloading of delivery vehicles or shelving within the facility, assembly of components or packages, etc.), etc.

At 208, the central processing system may receive sensor data associated with an inventory item located at the location. For example, the central processing system 104 may receive the sensor data 106, decode the sensor data 106 (e.g., generate a series of frames, segment the image data, classify objects within the image data, etc.), pre-process the sensor data 106 (e.g., remove at least some of the image data prior to processing), track interference associated with the sensor data 106, encode the sensor data 106 (e.g., in one example, generate data structures, such as vectors or arrays of characteristics associated with segmented and classified objects within the image data for input to a machine learned model, among others), analyze the sensor data 106 (such as process by one or more machine learned models), and then generate a visualization of the sensor data 106 for an operator to be presented on a display device.

At 210, the central processing system may determine a status of the inventory item based at least in part on an output of a machine learned model accepting the sensor data as an input, the status including at least one of inventory identification, an inventory count, a quality status, a safety status, an age, or a documentation status. For example, the central processing system 104 may determine, based on the sensor data 106, the oldest inventory meeting a set of reequipments. The central processing system 104 may also determine that stock of particular types of inventory has decreased below a threshold. In yet another example, the central processing system 104 may determine quality issue or problems with the inventory (such as water damage, deterioration or corrosion of inventory, rodent or insect infestations, carton or item count on individual pallets, etc.). The central processing system 104 may also determine safety issues, such as inventory, or other items stored in the facility, located within isles or human occupied regions of the facility. In some cases, such as when new inventory arrives, the central processing system 104 may extract product information, quality information, government or delivery clearances or approvals, facial or personal features of the delivery operators, and otherwise check in and accept inventory for delivery on behalf of the facility. In some cases, the central processing system 104 may reject deliveries when the inventory is incorrect, below a threshold quality level, or the paperwork associated with the driver, delivery company, delivery vehicle, etc. is deficient in one or more areas.

At 212, the central processing system may perform an operation in response to the status of the inventory item. For example, the central processing system 104 may provide alerts 108 to facility systems 110 or an operator of the processing equipment with the alert 108 to retrieve the inventory and deliver the inventory to an outbound truck or vessel, may place an order for additional inventory in response to the inventory falling below the threshold, may send an alert 108 to the facility systems alerting an operator of the facility to the quality issue, may send an alert 108 to the facility systems alerting an operator of the facility to the safety issue, accept inventory, reject inventory, and/or generate control signals 112 causing a facility gate to open or a crane or other unloading/loading equipment to commence a corresponding operation (e.g., unloading or loading of inventory).

FIG. 3 is a flow diagram illustrating an example process 300 associated with the sensor systems and central processing systems for managing and monitoring inventory at a storage facility according to some implementations.

At 302, a central processing system may generate a navigation path for an autonomous vehicle by determining a route to a location and at least one static sensor positioned along the route. For example, the central processing system 104 may be configured to perform the navigation and path planning (e.g., flight path) for individual vehicles 102(1) as the vehicles 102(1) traverse the facility (warehouse or yard) and provide this information via the sensor instructions 134. For example, the sensor data 106 received by the central processing system 104 may include forward-facing image data from each of the vehicles 102(1) and the central processing system 104 may determine a path, trajectory, speed (acceleration, velocity, etc.) for each vehicle 102(1) in substantially real time. In this manner, the vehicles 102(1) may have reduced processing requirement and reduced battery usage, thereby allowing the vehicles 102(1) to be smaller and remain aloft for longer periods of time. For example, the navigation and path planning modules of the central processing system 104 may receive the sensor data 106, segment image data included in the sensor data 106, identify obstructions to a planned path of the vehicle 102(1), classify the obstructions (e.g., static or dynamic), determine a risk associated with the obstruction, perform tracking on the obstruction, and generate a trajectory to avoid the obstruction or an estimated position of the obstruction (e.g., when the obstruction is dynamic). In some cases, the path of each vehicle 102(1) may be preplanned or reoccurring via known safe passages. In these cases, the central processing system 104 may be configured to perform obstruction avoidance or otherwise detect and avoid unexpected obstructions or obstacles within the flight path of the vehicles 102(1) in substantially real-time and provide flight path instructions accordingly, via the sensor instructions 134. Thus, in these cases, the processing and resources and time associated with planning the path or trajectory of the vehicles 102(1) may be reduced.

At 304, a central processing system may an instruction to the autonomous vehicle to follow the navigation path by communicating with the at least one static sensor. For example, the central processing system 104 may send sensor instructions 134 to the sensor system 102 after determining a rotation or schedule associated with scanning the facility (e.g., determining all items in a facility are inventoried on a regular basis), assigning vehicles 102(1) to areas or regions of the facility for inventorying (e.g., to avoid collision between vehicles 102(1)), recharging the vehicles 102(1), and movement/assignment of other processing equipment to various tasks and regions of the facility (e.g., loading/unloading of delivery vehicles or shelving within the facility, assembly of components or packages, etc.), etc.

At 306, a central processing system may receive sensor data associated with an inventory item. For example, the central processing system 104 may receive the sensor data 106, decode the sensor data 106 (e.g., generate a series of frames, segment the image data, classify objects within the image data, etc.), pre-process the sensor data 106 (e.g., remove at least some of the image data prior to processing), track interference associated with the sensor data 106, encode the sensor data 106 (e.g., in one example, generate data structures, such as vectors or arrays of characteristics associated with segmented and classified objects within the image data for input to a machine learned model, among others), analyze the sensor data 106 (such as process by one or more machine learned models), and then generate a visualization of the sensor data 106 for an operator to be presented on a display device.

At 308, the central processing system may determine a status of the inventory item based at least in part on an output of a machine learned model accepting the sensor data as an input, the status including at least one of inventory identification, an inventory count, a quality status, a safety status, an age, or a documentation status. For example, the central processing system 104 may determine, based on the sensor data 106, the oldest inventory meeting a set of reequipments. The central processing system 104 may also determine that stock of particular types of inventory has decreased below a threshold. In yet another example, the central processing system 104 may determine quality issue or problems with the inventory (such as water damage, deterioration or corrosion of inventory, rodent or insect infestations, carton or item count on individual pallets, etc.). The central processing system 104 may also determine safety issues, such as inventory, or other items stored in the facility, located within isles or human occupied regions of the facility. In some cases, such as when new inventory arrives, the central processing system 104 may extract product information, quality information, government or delivery clearances or approvals, facial or personal features of the delivery operators, and otherwise check in and accept inventory for delivery on behalf of the facility. In some cases, the central processing system 104 may reject deliveries when the inventory is incorrect, below a threshold quality level, or the paperwork associated with the driver, delivery company, delivery vehicle, etc. is deficient in one or more areas.

At 310, the central processing system may perform an operation in response to the status of the inventory item. For example, the central processing system 104 may provide alerts 108 to facility systems 110 or an operator of the processing equipment with the alert 108 to retrieve the inventory and deliver the inventory to an outbound truck or vessel, may place an order for additional inventory in response to the inventory falling below the threshold, may send an alert 108 to the facility systems alerting an operator of the facility to the quality issue, may send an alert 108 to the facility systems alerting an operator of the facility to the safety issue, accept inventory, reject inventory, and/or generate control signals 112 causing a facility gate to open or a crane or other unloading/loading equipment to commence a corresponding operation (e.g., unloading or loading of inventory).

FIG. 4 is a flow diagram illustrating an example processes associated with the sensor systems and central processing systems for managing and monitoring inventory at a storage facility according to some implementations.

At 402, the central processing system may receive first data associated with a first inventory item associated with a transport handling unit (THU). For example, the central processing system 104 may receive the sensor data 106, decode the sensor data 106 (e.g., generate a series of frames, segment the image data, classify objects within the image data, etc.), pre-process the sensor data 106 (e.g., remove at least some of the image data prior to processing), track interference associated with the sensor data 106, encode the sensor data 106 (e.g., in one example, generate data structures, such as vectors or arrays of characteristics associated with segmented and classified objects within the image data for input to a machine learned model, among others), analyze the sensor data 106 (such as process by one or more machine learned models), and then generate a visualization of the sensor data 106 for an operator to be presented on a display device.

At 404, the central processing system may receive second data associated with a second inventory item associated with the transport handling unit (THU). For example, the central processing system 104 may receive the sensor data 106, decode the sensor data 106 (e.g., generate a series of frames, segment the image data, classify objects within the image data, etc.), pre-process the sensor data 106 (e.g., remove at least some of the image data prior to processing), track interference associated with the sensor data 106, encode the sensor data 106 (e.g., in one example, generate data structures, such as vectors or arrays of characteristics associated with segmented and classified objects within the image data for input to a machine learned model, among others), analyze the sensor data 106 (such as process by one or more machine learned models), and then generate a visualization of the sensor data 106 for an operator to be presented on a display device.

At 406, the central processing system may determine an error associated with at least one of the first inventory item or the second inventory item. For example, central processing system may process the image or video data using various techniques, such as a machine learned models, to determine inventory counts, quality, status, etc. associated with the inventory within the facility. In some cases, the central processing system may identify and recognize the presence of correct sticker or label on the carton or pallet or unit loading device (ULD). In some cases, the central processing system may assist the human operators or machine(s) with optimal build process of Transport Handling Unit (THU) such as pallets, unit load devices (ULDs), ocean containers, any object that may carry or otherwise transport an inventory item, etc. In some cases, the central processing system may process the image or video data on the camera hardware or on a separate device installed in the premises to minimize data transfer over the internet. In some cases, the central processing system may determine locations or cause the processing equipment or an operator of the processing equipment to access the inventory at the location for further processing. In some cases, the central processing system may read the text written on labels or pallets or cartons or Unit Load Devices (ULDs) to estimate the inventory accuracy. In some cases, the central processing system may determine that an operator within a facility has performed an incorrect operation (e.g., incorrect pickup, put away, replenishment, etc.) and the central processing system may send a message (e.g., notification) to the operator or to another operator that the incorrect action was performed.

At 408, the central processing system may send an alert to a device proximate to the THU indicating the error. For example, the central processing system may determine that the error comprises at least one of an incorrect inventory picking, incorrect inventory put away, an incorrect inventory replenish, an open inventory item, a closed inventory item, a damaged state of an inventory item, an open state of the THU, a closed state of the THU, a damaged state of the THU, an incorrect inventory label, an incorrect or THU label. The central processing system may then send at least one of a visual alert or a sound alert and the device is associated with an operator. In some cases, the alert may include a recommendation for positioning at least one of the first inventory item or the second inventory item on the THU. In some cases, the central processing system may determine a dimension, a weight, or a volume of the THU based on the received data and may provide a recommendation for positioning inventory on the THU based on this data.

Figure 5:
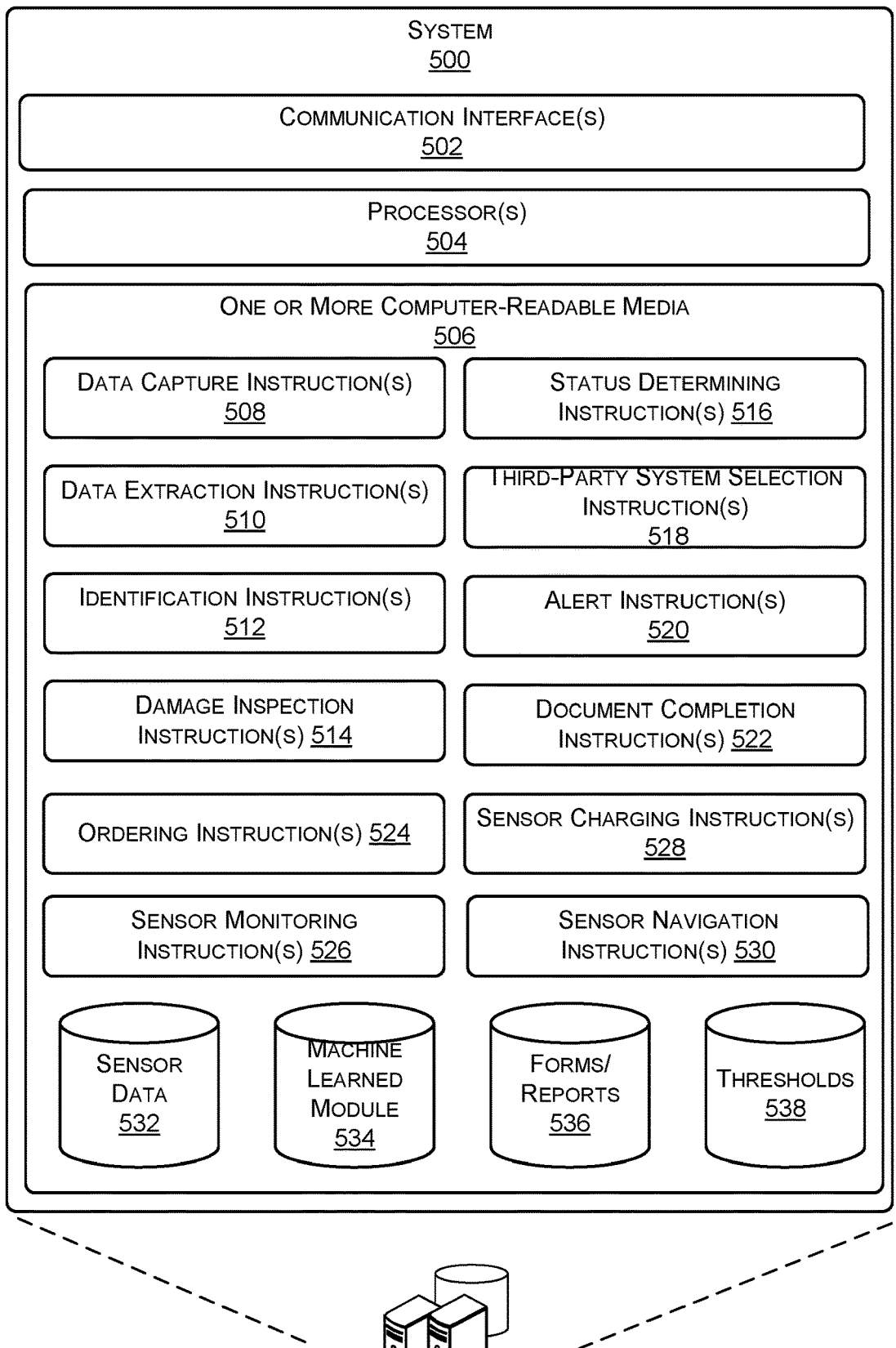
FIG. 5 is an example system that may implement the techniques described herein according to some implementations.

FIG. 5 is an example system 500 that may implement the techniques described herein according to some implementations. The system 500 may include one or more communication interface(s) 502 (also referred to as communication devices and/or modems), one or more processor(s) 504, and one or more computer readable media 506.

The system 500 can include one or more communication interfaces(s) 502 that enable communication between the system 500 and one or more other local or remote computing device(s) or remote services, such as a sensor system of FIG. 1. For instance, the communication interface(s) 502 can facilitate communication with other central processing systems, a sensor system, or other facility systems. The communications interfaces(s) 502 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

The system 500 may include one or more processors 504 and one or more computer-readable media 506. Each of the processors 504 may itself comprise one or more processors or processing cores. The computer-readable media 506 is illustrated as including memory/storage. The computer-readable media 506 may include volatile media (such as random access memory (RAM)) and/or nonvolatile media (such as read only memory (ROM), Flash memory, optical disks, magnetic disks, and so forth). The computer-readable media 506 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

Several modules such as instructions, data stores, and so forth may be stored within the computer-readable media 506 and configured to execute on the processors 504. For example, as illustrated, the computer-readable media 506 stores data capture instructions 508, data extraction instructions 510, identification instructions 512, damage inspection instructions 514, status determining instructions 516, third-party system selection instruction 518, alert instructions 520, document completion instructions 522, ordering instructions 524, sensor monitoring instructions 526, sensor charging instructions 528, sensor navigation instructions 530, as well as other instructions, such as an operating system. The computer-readable media 506 may also be configured to store data, such as sensor data 532, machine learned models 534, forms and reports 536, and thresholds 538, as well as other data.

The data capture instructions 508 may be configured to utilize or activate sensor systems, such as the sensor system 102, to capture data associated with inventory, a vehicle, driver, operator, container, package, chassis, or other system or vessel related to a storage facility. In some cases, the data capture instructions 508 may select between individual sensor systems 106 based on a current weather, visibility, light, time of day, time of year, physical location, type and/or size of vehicle, type and/or size of container, number of containers, and the like.

The data extraction instructions 510 may be configured to input the captured sensor data 532 into one or more machine learned models 534 to generate and/or extract text and data associated with the inventory, vehicle, container, and/or content of the containers. The data may be extracted from the exterior or interior of the inventory, vehicle, or containers, documents associated with the inventory, vehicle, or containers, and the like.

The identification instructions 512 may be configured to determine an identity of the inventory, vehicle, container, or content of the containers, a chassis associated with the inventory, vehicle, a driver or operator of the vehicle, an entity associated with the inventory, vehicle, container, or content of the containers. For example, the identification instructions 512 may utilize one or more machine learned models 534 with respect to the sensor data 532 to determine the identification as discussed above.

The damage inspection instructions 514 may be configured to input the captured sensor data 532 into one or more machine learned models 534 to detect damage with respect to the inventory, vehicle, the chassis, the containers, and/or the content of the containers. For example, the damage inspection instructions 514 may detect damage using the machine learned models then compare the damage detected with any known damage to determine if the damage was received while the inventory or the vehicle was in transit. In some cases, the damage inspection instructions 514 be configured to input the captured sensor data 532 into one or more machine learned models 534 to detect damage with respect to deterioration or corrosion of inventory, rodent or insect infestations, or the like.

In some cases, the damage inspection instructions 514 may also rate the damage, for instance, using a severity rating.

The status determining instructions 516 may be configured to input the captured sensor data 532 into one or more machine learned models 534 to determine a status with respect to the inventory, vehicle, the driver, the documentation, the chassis, the containers, and/or the content of the containers. For example, the status determining instructions 516 may determine that the presented documentation is incomplete or lacking one or more authorizations. In some cases, the status determining instructions 516 may be configured to input the captured sensor data 532 into one or more machine learned models 534 to determine an age of inventory items and determine that a particular inventory item of a certain type of inventory items is the oldest inventory item stored at the storage facility. In this case, if an order is processed for the certain type of inventory item, the system 500 may select the oldest inventory item to be delivered.

The third-party system selection instruction 518 may be configured to select and/or identify various entities and associated documentation that is required, associated with the inventory, vehicle, container, or content of the container and/or should otherwise be completed by the document completion instructions 522. For example, the third-party system selection instruction 518 may select the entities and/or documents based at least in part on the data generated by the data extraction instructions 510, the identification instructions 512, the damage inspection instructions 514, the status determining instructions 516, and/or a combination thereof.

The alert instructions 520 may be configured to alert or otherwise notify a facility operator and/or facility system in response to the data generated by the data extraction instructions 510, the identification instructions 512, the damage inspection instructions 514, the status determining instructions 516, and/or a combination thereof. For example, the alert instructions 520 may open a gate, request manual inspection of an inventory item, request manual inspection of the contents of the container or review of a document, send an alert that the inventory count has dropped below a threshold value, send an alert that inventory item has experienced physical damage, send an alert that a position of an item (e.g., the inventory item) is associated with a safety issue, and the like.

The document completion instructions 522 may be configured to complete the documents selected by the third-party system selection instructions 518 based on the data generated by the data extraction instructions 510, the identification instructions 512, the damage inspection instructions 514, the status determining instructions 516, and/or a combination thereof. The document completion instructions 522 may also transmit or submit the completed documents to the appropriate third-party systems on behalf of the facility, driver, or the like.

The ordering instructions 524 may be configured to order additional and/or new inventory in response to the data generated by the data extraction instructions 510, the identification instructions 512, the damage inspection instructions 514, the status determining instructions 516, and/or a combination thereof. For example, the order instructions 524 may determine that an inventory count has dropped below a threshold value (e.g., based on the thresholds 538) and place an order for additional and/or new inventory.

The sensor monitoring instructions 526 may be configured to monitor a sensor system, such as the sensor system 102, based on the sensor data 532. For example, the sensor monitoring instructions 526 may send instructions to one or more vehicles (e.g., vehicle(s) 102(1)), charging stations (e.g., charging station(s) 102(2)), and/or static sensors (e.g., static sensor(s) 102(3)) to report a status, such as not limited to, a location, battery power level, current activity (e.g., charging, not charging, in flight, etc.), identification information, etc.

The sensor charging instructions 528 may be configured to monitor a charging status of a sensor system, such as the sensor system 102, based on the sensor data 532. For example, the sensor charging instructions 526 may send instructions to one or more vehicles (e.g., vehicle(s) 102(1)), charging stations (e.g., charging station(s) 102(2)), and/or static sensors (e.g., static sensor(s) 102(3)) to participate in a charging action. In some cases, this may include sending an instruction to an vehicle to travel to a closest charging station or a particular charging station. In some cases, this may include sending a charging schedule to one or more vehicles such that some vehicles may be in flight performing inventory monitoring activities while other vehicles are charging at charging stations.

The sensor navigation instructions 530 may be configured to generate and provide navigation instructions to a sensor system, such as the sensor system 102, based on the sensor data 532. For example, the sensor data 532 received by the system 500 may include forward-facing image data from each of the vehicles and the system 500 may determine a path, trajectory, speed (acceleration, velocity, etc.) for each vehicle in substantially real time. In this manner, the vehicles may have reduced processing requirement and reduced battery usage, thereby allowing the vehicles to be smaller and remain aloft for longer periods of time. For example, the system 500 may receive the sensor data 532, segment image data included in the sensor data 532, identify obstructions to a planned path of the vehicle, classify the obstructions (e.g., static or dynamic), determine a risk associated with the obstruction, perform tracking on the obstruction, and generate a trajectory to avoid the obstruction or an estimated position of the obstruction (e.g., when the obstruction is dynamic). In some cases, the path of each vehicle may be preplanned or reoccurring via known safe passages. In these cases, the system 500 may be configured to perform obstruction avoidance or otherwise detect and avoid unexpected obstructions or obstacles within the path of the Vehicles in substantially real-time and provide navigation path instructions accordingly, via the sensor navigation instructions 530. Thus, in these cases, the processing and resources and time associated with planning the path or trajectory of the vehicles may be reduced.

The sensor navigation instructions 530 may also include a rotation or schedule associated with scanning the facility (e.g., determining all items in a facility are inventoried on a regular basis), assigning vehicles to areas or regions of the facility for inventorying (e.g., to avoid collision between vehicles, recharging the vehicles, and movement/assignment of other processing equipment to various tasks and regions of the facility (e.g., loading/unloading of delivery vehicles or shelving within the facility, assembly of components or packages, etc.), etc.

In some implementations, the sensor navigation instructions 530 may instruct the static sensors to trigger in a predefined order. In this example, the static sensors may include a wireless emitter and the vehicles may be configured to follow the path associated with the wireless signal. For example, each emitter within an aisle or rack may be active and deactivated in a sequence to cause the vehicle to fly down the aisle or between two racks. In this manner, the vehicle may travel from one emitter to the next reducing the overall complexity associated with path finding and navigation in indoor and/or outdoor environments. In some cases, one or more vehicles may be paired to the emitters or static sensors of a particular isle or rack, such that the static sensors along the isle or rack only cause a desired one of the plurality of vehicles to traverse the rack or isle, thereby preventing inadvertent collisions.

In other implementations, the sensor navigation instructions 530 may instruct the static sensors to trigger or activate in response to detecting a nearby vehicle. In this manner, the system 500 may only receive sensor data 532 from static sensors devices in proximity (e.g., within a threshold distance) of an vehicle, thereby reducing the amount of data to be processed. In another implementation, the static sensors may be activated and deactivated along the planned path of the vehicles based on an estimated location or time at which the vehicle is passing by the corresponding static sensors.

Figure 6:
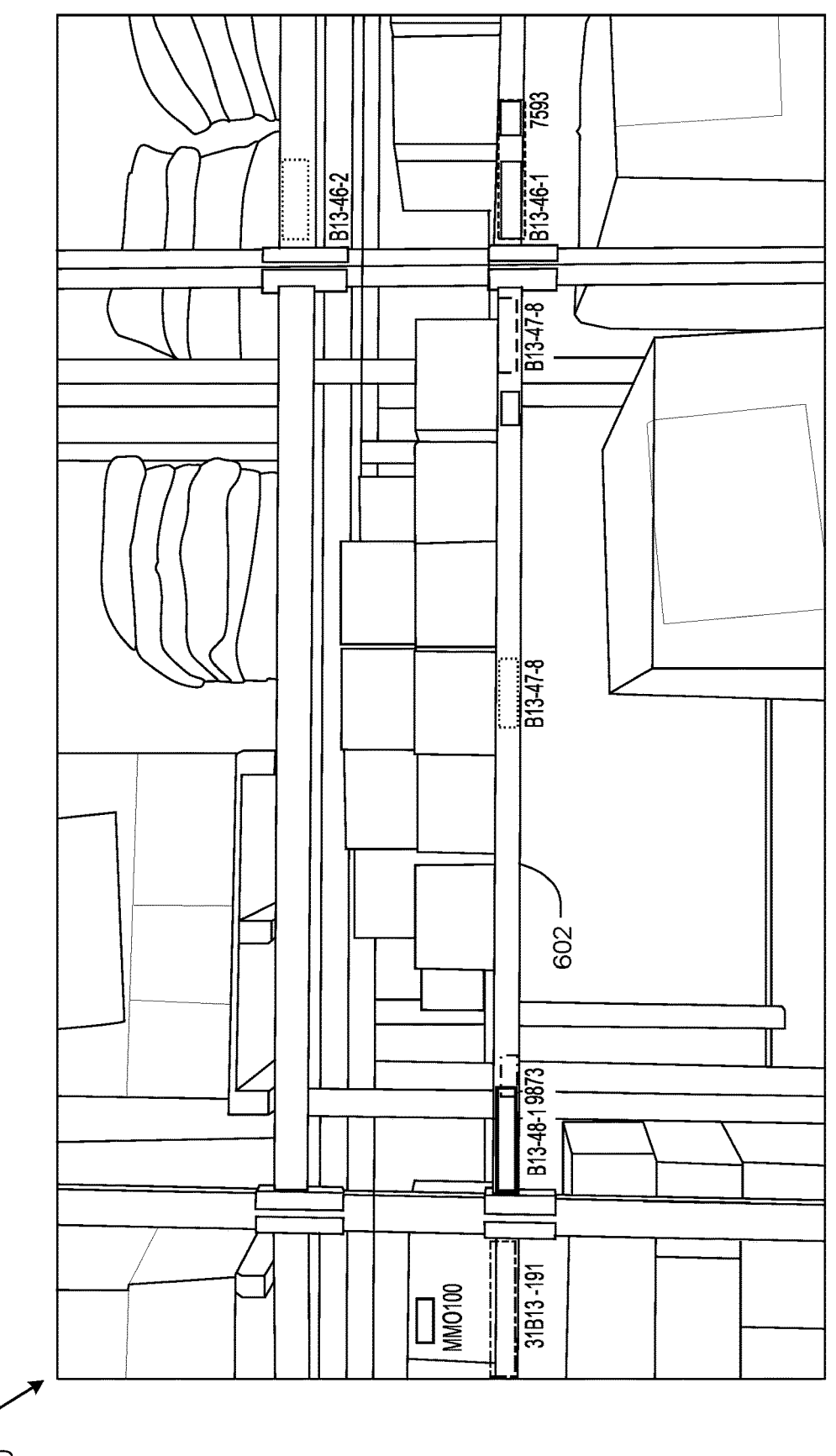
FIG. 6 is an example pictorial view associated with the systems of FIGS. 1-5 according to some implementations.

FIG. 6 is another example pictorial view 600 associated with the systems of FIGS. 1-5 according to some implementations. In this example, the sensor system may be fixed or mobile (e.g., an AAV) within a storage facility or at an unloading point of a facility. In this example, the sensor system, either fixed or mobile (e.g., associated with a land-based or AAV within the facility), may capture sensor and image data associated with the contents of the shelves 602 as shown. For instance, in this example, the sensor data may be input into one or more machine learned models that are configured to extract data, such as shelf location, packaging or labels on each item, a number of items, and the like. The extracted data may then be used to send instructions for packing, re-location of merchandise, re-ordering of inventory, and/or loading of a vehicle. The data may also be used to complete various documentation and/or inspect each package in a manner discussed above with respect to the contents of the containers.

Figure 7:
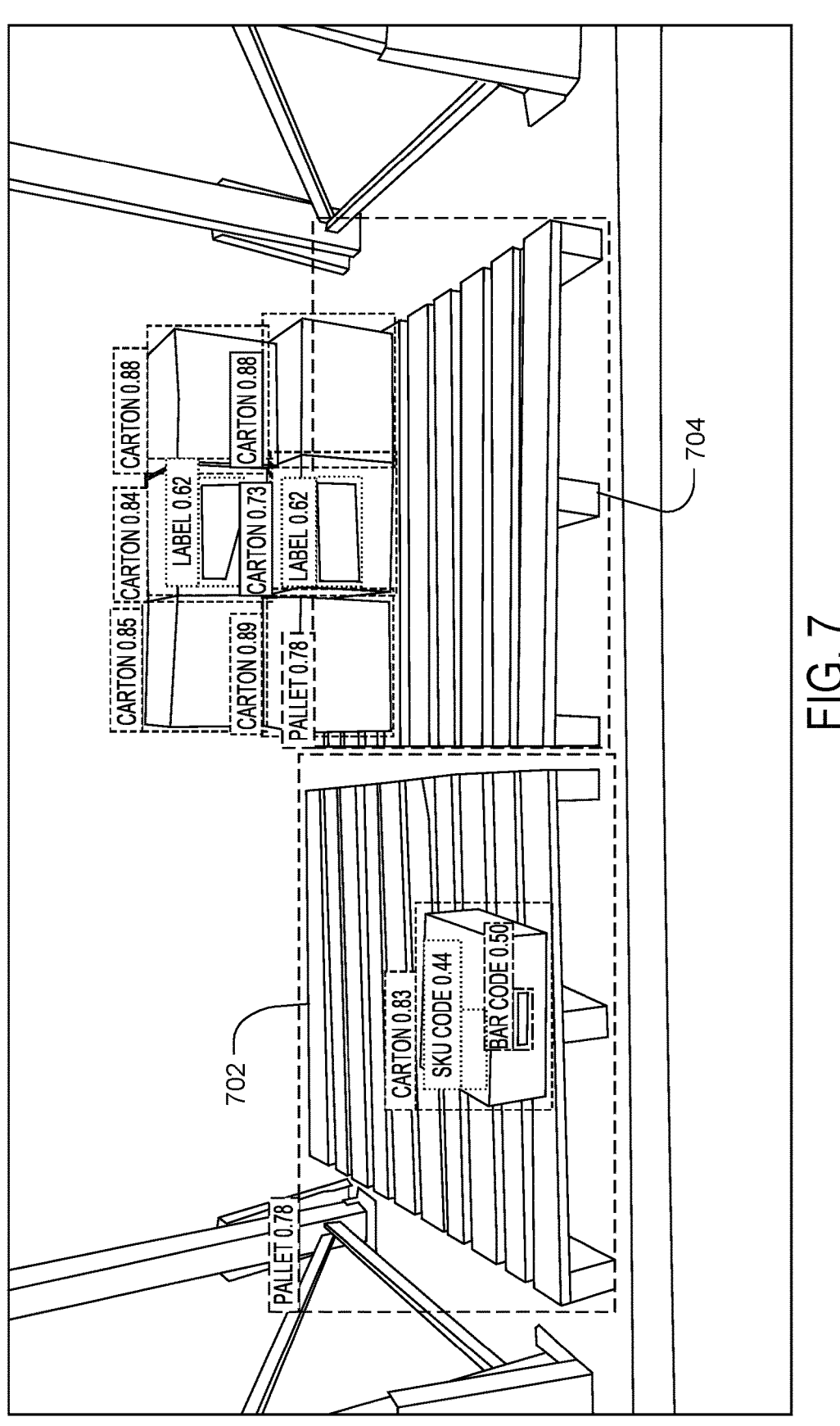
FIG. 7 is another example pictorial view associated with the systems of FIGS. 1-5 according to some implementations.

FIG. 7 is another example pictorial view 700 associated with the systems of FIGS. 1-5 according to some implementations. In this example, items or packages on pallets 702 and 704 are being identified, counted, and categorized by the system. For instance, the system may capture sensor and/or image data associated with the contents of the pallets 702 and 704. The system may then input the sensor and/or image data into one or more machine learned models which may then output the identification information, item type or class, as well as a number of items, estimated weight, and other dimensions. This information may then be used to schedule, verify, and/or authorize transit associated with the items and packages, as discussed above.

Figure 8:
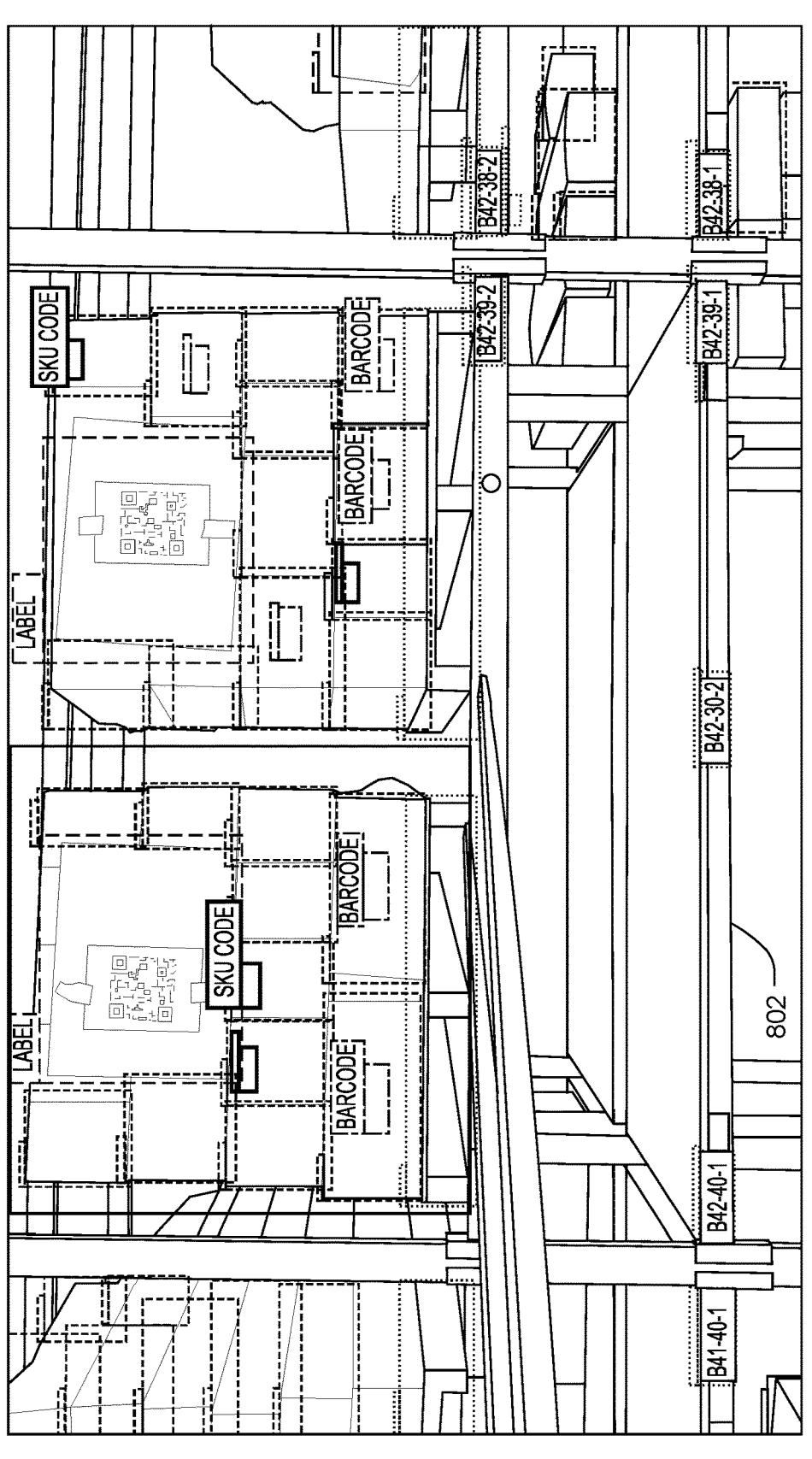
FIG. 8 is another example pictorial view associated with the systems of FIGS. 1-5 according to some implementations.

FIG. 8 is another example pictorial view 800 associated with the systems of FIGS. 1-5 according to some implementations. In this example, similar to the view 600 of FIG. 6, the sensor system may be fixed or mobile (e.g., an AAV) within a storage facility or at an unloading point of a facility. In this example, the sensor system, either fixed or mobile, may capture sensor and image data associated with the contents of the shelves 802 as shown. In this example, the system is identifying each individual package and/or item on the shelf 802 and within the field of view of the sensor system. The system is also identifying various markers, such as barcodes, SKUs, numerical identifiers, and the like, usable to determine the identity and content of each package. Additionally, it should be understood, that the system is extracting the data via one or more machine learned models without the data (e.g., bar code, SKU, and the like) being at a predefined position with respect to the shelf 802, package or the like. In this manner, the system discussed herein, does not require particular alignment or placement of codes, packages, pallets, or the like.

Figure 9:
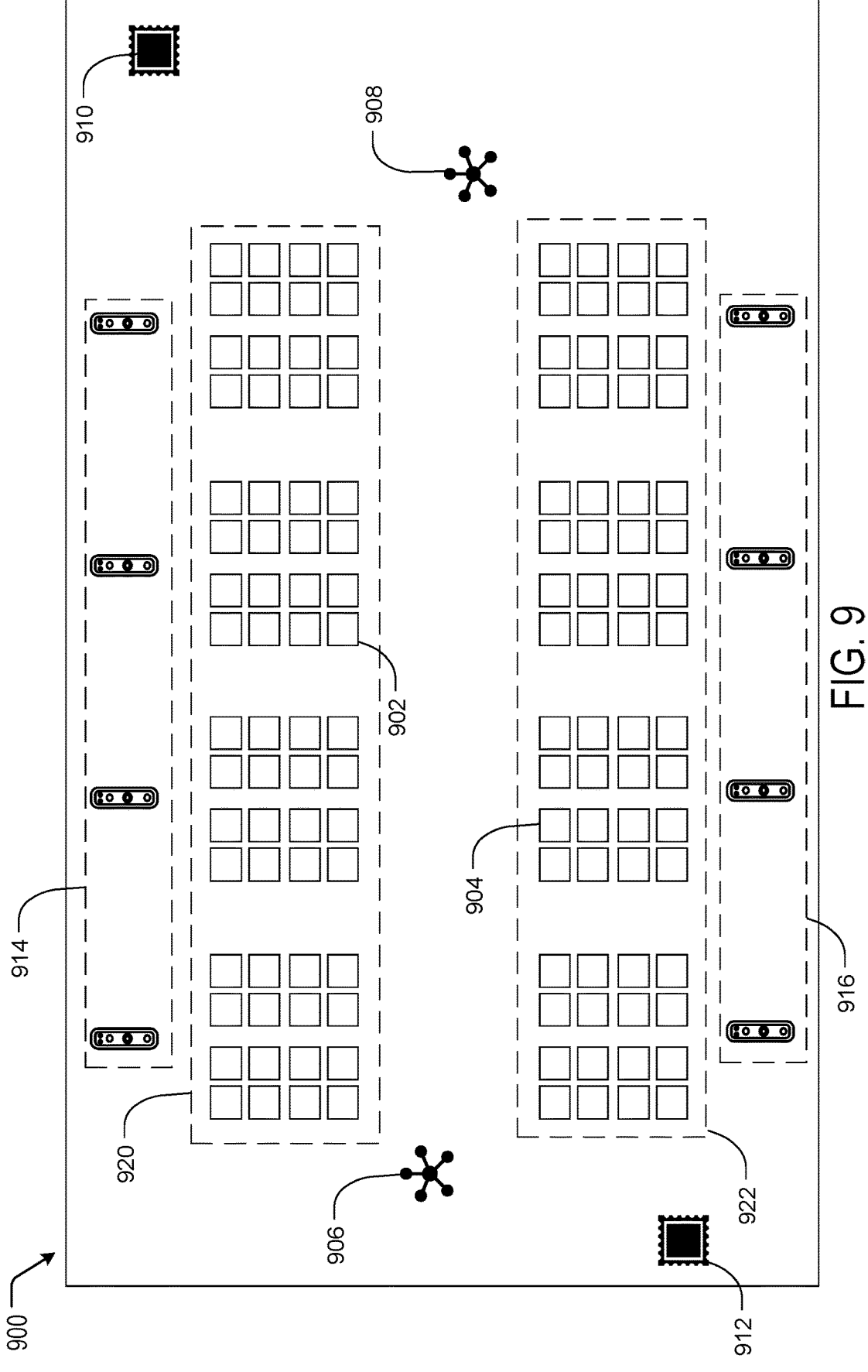
FIG. 9 is an example diagram associated with the systems of FIGS. 1-5 according to some implementations.

FIG. 9 is an example illustrative diagram including a storage facility 900 storing inventory 902 and inventory 904. The storage facility 900 may also include an vehicle 906, an vehicle 908, a charging station 910, and charging station 912, a first set of static sensors 914 and a second set of static sensors 916. A central processing system, such as the central processing system 104 may organize the storage facility into multiple sections, such as a section 920 that includes the inventory 902 and a section 922 that includes the inventory 904. In some cases, the central processing system may be configured to perform the navigation and path planning (e.g., flight path) for the vehicle 906 and vehicle 908 as they traverse the storage facility 900. For example, the central processing system may receive forward-facing image data from each of the vehicle 906 and vehicle 908 and determine a path, trajectory, speed (acceleration, velocity, etc.) for each vehicle 906 and vehicle 908 in substantially real time. In this manner, the vehicle 906 and vehicle 908 may have reduced processing requirement and reduced battery usage, thereby allowing the vehicle 906 and vehicle 908 to be smaller and remain aloft for longer periods of time. For example, the navigation and path planning modules of the central processing system may receive the image data, segment the image data, identify obstructions to a planned path of the vehicle 906 and vehicle 908 (e.g., flight path), classify the obstructions (e.g., static or dynamic), determine a risk associated with the obstruction, perform tracking on the obstruction, and generate a trajectory to avoid the obstruction or an estimated position of the obstruction (e.g., when the obstruction is dynamic). In some cases, the path of each vehicle 906 and vehicle 908 may be preplanned or reoccurring via known safe passages. In these cases, the central processing system may be configured to perform obstruction avoidance or otherwise detect and avoid unexpected obstructions or obstacles within the flight path of the vehicle 906 and vehicle 908 in substantially real-time. Thus, in these cases, the processing and resources and time associated with planning the path or trajectory of the vehicle 906 and vehicle 908 may be reduced.

The central processing system may also determine a rotation or schedule associated with scanning the facility 900 (e.g., determining all items in a facility are inventoried on a regular basis), assigning the vehicle 906 and vehicle 908 to areas or regions of the facility 900 (e.g., to avoid collision between vehicles), recharging the vehicle 906 and vehicle 908, and movement/assignment of other processing equipment to various tasks and regions of the facility 900 (e.g., loading/unloading of delivery vehicles or shelving within the facility, assembly of components or packages, etc.), etc. For example, the central processing system may assign the vehicle 906 to scan inventory located in the section 920 while assigning the vehicle 908 to scan inventory located in the section 922. In some cases, the central processing system may assign the vehicle 906 to charge at the charging station 912 while assigning the vehicle 908 to charge at the charging station 910.

In some implementations, individual static sensors of the first set of static sensors 914 and the second set of static sensors 916 may be configured to trigger in a predefined order. In this example, the static sensors may include a wireless emitter and the vehicle 906 and vehicle 908 may be configured to follow the path associated with the wireless signal. For example, each emitter within an aisle or rack may be activated and deactivated in a sequence to cause the vehicle 906 to fly down the aisle or between two racks near the first set of static sensors 914 and each emitter within an aisle or rack may be activated and deactivated in a sequence to cause the vehicle 908 to fly down the aisle or between two racks near the second set of static sensors 916. In this manner, the vehicle 906 and vehicle 908 may travel from one emitter to the next reducing the overall complexity associated with path finding and navigation in indoor and/or outdoor environments. In some cases, one or more vehicle may be paired to the emitters or sensors of a particular isle or rack, such that the sensors along the isle or rack only cause a desired one of the plurality of vehicles to traverse the rack or isle, thereby preventing inadvertent collisions.

In other implementations, the first set of static sensors 914 and the second set of static sensors 916 may trigger or activate in response to detecting a nearby vehicle 906 or vehicle 908. In this manner, the central processing system may only receive data from the first set of static sensors 914 and the second set of static sensors 916 in proximity (e.g., within a threshold distance) of an vehicle 906 or vehicle 908, thereby reducing the amount of data to be processed. In another implementation, the first set of static sensors 914 and the second set of static sensors 916 may be activated and deactivated along the planned path of the vehicle 906 or vehicle 908 based on an estimated location or time at which the vehicle 906 or vehicle 908 is passing by the corresponding first set of static sensors 914 or the second set of static sensors 916.

FIG. 10 is an example pictorial view 1000 associated with the systems of FIGS. 1-5 according to some implementations. In the current example, a vehicle 1002, such as a delivery van, is viewed from above. The vehicle 1002 may be approaching an exit or entry of a facility as discussed above. The driver 1004 is displaying an authorization document 1006, such as a license, through the window 1008 of the vehicle 1002. The sensor system (not shown) is capturing sensor data and/or image data, generally indicated by 1010 associated with the displayed document 1006.

The sensor system, as discussed above, may extract textual content from the document 1006 using one or more machined learned models and, using the output of the machine learned model, authenticate the vehicle 1002, the driver 1004, and the like as well as to select or identify additional documents or paperwork associated with the delivery, complete the identified documents, and submit the completed documents to an appropriate entity. In some cases, sensor system may translate the extracted content in order to complete one or more of the identified paperwork to further reduce the likelihood of an issue with one or more of the entities authorization the delivery. FIG. 11 is another example pictorial view 1100 associated with the systems of FIGS. 1-5 according to some implementations. In this example, the vehicle 1102 may again be approaching an exit or entry of a logistics facility. In this example, the senor system may capture sensor data and/or image data associated with a face or other feature of the user 1104, as indicated by 1106. Again, the sensor system may input the sensor or image data into one or more machine learned models to determine an identity of the driver 1104 or other operator (such as when the vehicle is a cargo ship or the like). In the current example, the sensor system is capturing data from above or through a front windshield 1106 of the vehicle 1102. It should be understood that alternative or additional sensor systems may be positioned such as to capture sensor and/or image data via the side windows or from a front, side, or other perspectives. In some instances, the sensor data from multiple sensor systems may be input into the machine learned models to determine the identity of the driver 1104.

Although the discussion above sets forth example implementations of the described techniques, other architectures may be used to implement the described functionality and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

Examples Clauses

A. A method comprising: determining a navigation path within a storage facility for an autonomous vehicle to travel to a location; sending the navigation path to the autonomous vehicle; receiving an indication that the autonomous vehicle has arrived at the location; receiving sensor data associated with an inventory item at the location; determining a status of the inventory item based at least in part on an output of a machine learned model accepting the sensor data as an input, the status including at least one of inventory identification, an inventory count, a quality status, a safety status, an age, or a documentation status; and performing an operation in response to the status of the inventory item.

B. The method of paragraph A, further comprising determining, based at least in part on the sensor data, that the inventory count has dropped below a threshold value and the operation comprises ordering additional inventory items.

C. The method of paragraph A, further comprising: receiving image data from the autonomous vehicle while the autonomous vehicle is in traveling to the location; identify at least one obstruction to a navigation path of the autonomous vehicle; classifying the at least one obstruction; determining a risk associated with the at least one obstruction; performing tracking on the at least one obstruction; and generating a trajectory to avoid the at least one obstruction or an estimated position of the at least one obstruction.

D. The method of paragraph A, further comprising generating a schedule for the autonomous vehicle in which a first portion of the schedule includes charging a battery of the autonomous vehicle at a charging station and a second portion of the schedule includes performing inventory monitoring activities.

E. The method of paragraph A, further comprising: generating the navigation path for the autonomous vehicle by determining a route to the location and at least one static sensor positioned along the route; and sending an instruction to the autonomous vehicle to follow the navigation path by communicating with the at least one static sensor.

F. The method of paragraph E, wherein the at least one static sensor includes an Internet-of-Things (IoT) device.

G. A method comprising: generating a navigation path for an autonomous vehicle by determining a route to a location and at least one static sensor positioned along the route; sending an instruction to the autonomous vehicle to follow the navigation path by communicating with the at least one static sensor; receiving sensor data associated with an inventory item at the location; determining a status of the inventory item based at least in part on an output of a machine learned model accepting the sensor data as an input, the status including at least one of an inventory count, a quality status, a safety status, a location, an age, or a documentation status; and performing an operation in response to the status of the inventory item.

H. The method of paragraph G, further comprising: receiving image data from the autonomous vehicle while the autonomous vehicle is in flight; identify at least one obstruction to the navigation path of the autonomous vehicle; classifying the at least one obstruction; determining a risk associated with the at least one obstruction; performing tracking on the at least one obstruction; and generating a trajectory to avoid the at least one obstruction or an estimated position of the at least one obstruction.

I. The method of paragraph G, further comprising determining, based at least in part on the sensor data, that the inventory count has dropped below a threshold value and the operation comprises ordering additional inventory items.

J. The method of paragraph G, further comprising determining, based at least in part on the sensor data, that the inventory item has experienced physical damage and the operation comprises alerting a facility operator that the inventory item has been physically damaged.

K. The non-transitory computer-readable medium of paragraph G, further comprising determining, based at least in part on the sensor data, that a position of the inventory item is associated with a safety issue and the operation comprises alerting a facility operator to the safety issue.

L. The non-transitory computer-readable medium of paragraph G, further comprising determining, based at least in part on the sensor data, that the inventory item is an oldest inventory item of a plurality of inventory items and the operation comprises sending an instruction to retrieve the inventory item for delivery.

M. The non-transitory computer-readable medium of paragraph G, wherein the inventory item comprises a new inventory item arriving at a storage facility and the status of the inventory item includes at least one of product information, government clearances, or delivery clearances.

N. The non-transitory computer-readable medium of paragraph G, wherein the sensor data includes one or more of the following: red-green-blue image data; monocular image data; depth data; muon data; LIDIR data; SIWIR data; thermal data; or infrared data.

O. A method comprising: receiving first data associated with a first inventory item associated with a transport handling unit (THU); receiving second data associated with a second inventory item associated with the transport handling unit (THU); determining an error associated with at least one of the first inventory item or the second inventory item; and sending an alert to a device proximate to the THU indicating the error.

P. The method of paragraph O, wherein the error comprises at least one of an incorrect inventory picking, incorrect inventory put away, an incorrect inventory replenish, an open inventory item, a closed inventory item, a damaged state of an inventory item, an open state of the THU, a closed state of the THU, a damaged state of the THU, an incorrect inventory label, an incorrect or THU label.

Q. The method of paragraph O, wherein the alert comprises at least one of a visual alert or a sound alert and the device is associated with an operator.

R. The method of paragraph O, wherein the alert includes a recommendation for positioning at least one of the first inventory item or the second inventory item on the THU.

S. The method of paragraph O, further comprising: determining at least one of a dimension, a weight, or a volume of the THU; and sending a recommendation to the device for positioning at least one of the first inventory item or the second inventory item on the THU based at least in part on one of the dimension, the weight, or the volume.

T. The method of paragraph O, wherein at least one of the first data or the second data includes at least one of LIDAR data, SWIR data, or RBG camera data.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

What is claimed is:

1. A method comprising:
determining a navigation path within a storage facility for an autonomous vehicle to travel to a location;
sending the navigation path to the autonomous vehicle;
causing the autonomous vehicle to travel to the location along the navigation path;
receiving an indication that the autonomous vehicle has arrived at the location;
receiving sensor data associated with a first inventory item and a second inventory item at the location;
generating, based at least in part on the sensor data, second data associated with the first inventory item, the second data including a first vector of characteristics associated with the first inventory item;
generating, based at least in part on the sensor data, third data associated with the second inventory item, the third data including a second vector of characteristics associated with the second inventory item;
inputting the second data and the third data into a neural network that is trained end-to-end and receiving an error associated with at least one of the first inventory item or the second inventory item as an output of the neural network; and
causing the autonomous vehicle to perform an operation in response to the error.

2. The method of claim 1, further comprising:
determining, based at least in part on the sensor data, an inventory count associated with the first inventory items; and
responsive to determining that the inventory count has dropped below a threshold value, ordering additional inventory items.

3. The method of claim 1, further comprising:
receiving image data from the autonomous vehicle while the autonomous vehicle is in traveling to the location;
identifying at least one obstruction to a navigation path of the autonomous vehicle;
classifying the at least one obstruction;
determining a risk associated with the at least one obstruction;
performing tracking on the at least one obstruction; and
generating a trajectory to avoid the at least one obstruction or an estimated position of the at least one obstruction.

4. The method of claim 1, further comprising generating a schedule for the autonomous vehicle in which a first portion of the schedule includes charging a battery of the autonomous vehicle at a charging station and a second portion of the schedule includes performing inventory monitoring activities.

5. The method of claim 1, further comprising:
generating the navigation path for the autonomous vehicle by determining a route to the location and at least one static sensor positioned along the route; and
sending an instruction to the autonomous vehicle to follow the navigation path by communicating with the at least one static sensor.

6. The method of claim 5, wherein the at least one static sensor includes an Internet-of-Things (IoT) device.

7. A method comprising:

generating a navigation path for an autonomous vehicle by determining a route to a location and at least one static sensor positioned along the route;

sending an instruction to the autonomous vehicle to follow the navigation path by communicating with the at least one static sensor;

receiving sensor data associated with an inventory item at the location;

determining, based at least in part on the sensor data, that the inventory item has experienced physical damage;

determining a severity rating associated with the physical damage;

determining if the damage was received while the inventory was in transit by comparing the physical damage with a record of known damage; and sending instructions to a facility operator to perform a manual inspection of the inventory item that has been physically damaged;

determining a status of the inventory item based at least in part on an output of a machine learned model accepting the sensor data as an input, the status including an inventory count, a quality status, a safety status, a location, an age, or a documentation status; and causing the autonomous vehicle to perform an operation in response to the status of the inventory item.

8. The method of claim 7, further comprising:

receiving image data from the autonomous vehicle while the autonomous vehicle is in operation;

identifying at least one obstruction to the navigation path of the autonomous vehicle;

classifying the at least one obstruction;

determining a risk associated with the at least one obstruction;

performing tracking on the at least one obstruction; and generating a trajectory to avoid the at least one obstruction or an estimated position of the at least one obstruction.

9. The method of claim 7, further comprising determining, based at least in part on the sensor data, that the inventory count has dropped below a threshold value and the operation comprises ordering additional inventory items.

10. The method of claim 7, further comprising determining, based at least in part on the sensor data, that a position of the inventory item is associated with a safety issue and the operation comprises alerting a facility operator to the safety issue.

11. The method of claim 7, further comprising determining, based at least in part on the sensor data, that the inventory item is an oldest inventory item of a plurality of inventory items and the operation comprises sending an instruction to retrieve the inventory item for delivery.

12. The method of claim 7, wherein the inventory item comprises a new inventory item arriving at a storage facility and the status of the inventory item includes at least one of product information, government clearances, or delivery clearances.

13. The method of claim 7, wherein the sensor data includes one or more of the following:

red-green-blue image data;

monocular image data;

depth data;

muon data;

LIDAR data;

SWIR data;

thermal data; or infrared data.

14. A method comprising:

receiving sensor data associated with a transport handling unit (THU);

segmenting the sensor data to generate segmented sensor data;

classifying a first object within the segmented sensor data as a first inventory item and a second object within the segmented sensor data as a second inventory item;

generate, based at least in part on the sensor data, first data associated with the first inventory item, the first data including a first vector of characteristics associated with the first inventory item;

generating, based at least in part on the sensor data, second data associated with the second inventory item, the second data including a second vector of characteristics associated with the second inventory item;

determining, based at least in part on the first data and the second data, an error associated with at least one of the first inventory item or the second inventory item; and sending an alert to a device proximate to the THU indicating the error.

15. The method as recited in claim 14, wherein the error comprises at least one of an incorrect inventory picking, incorrect inventory put away, an incorrect inventory replenish, an open inventory item, a closed inventory item, a damaged state of an inventory item, an open state of the THU, a closed state of the THU, a damaged state of the THU, an incorrect inventory label, an incorrect or THU label.

16. The method as recited in claim 14, wherein the alert comprises at least one of a visual alert or a sound alert and the device is associated with an operator.

17. The method as recited in claim 14, wherein the alert includes a recommendation for positioning at least one of the first inventory item or the second inventory item on the THU.

18. The method as recited in claim 14, further comprising:

determining at least one of a dimension, a weight, or a volume of the THU; and sending a recommendation to the device for positioning at least one of the first inventory item or the second inventory item on the THU based at least in part on one of the dimension, the weight, or the volume.

19. The method as recited in claim 14, wherein at least one of the first data or the second data includes at least one of LIDAR data, SWIR data, or RBG camera data.

20. The method of claim 7, wherein generating the navigation path for the autonomous vehicle is based at least in part on data from at least one static sensor positioned along the route.

* * * * *